US012618998B2

(12) United States Patent

Procter

(10) Patent No.: US 12,618,998 B2

(45) Date of Patent: May 5, 2026

(54) SYSTEMS AND METHODS FOR GENERATING HIGH-ENERGY THREE-DIMENSIONAL COMPUTED TOMOGRAPHY IMAGES OF BULK MATERIALS

(71) Applicant: Rapiscan Holdings, Inc., Hawthorne, CA (US)

(72) Inventor: Mark Procter, Wilmslow (GB)

(73) Assignee: Rapiscan Holdings, Inc., Torrance, CA (US)

( * ) Notice: Subject to any disclaimer, the term of this patent is extended or adjusted under 35 U.S.C. 154(b) by 287 days.

(21) Appl. No.: 18/466,725

(22) Filed: Sep. 13, 2023

(65) Prior Publication Data

US 2024/0094147 A1 Mar. 21, 2024

Related U.S. Application Data

(60) Provisional application No. 63/375,900, filed on Sep. 16, 2022.

(51) Int. Cl.
*G01V 5/226* (2024.01)
*G01N 23/046* (2018.01)
(Continued)

(52) U.S. Cl.
CPC ........... *G01V 5/226* (2024.01); *G01N 23/046* (2013.01); *G01N 23/087* (2013.01); *G01N 23/10* (2013.01);
(Continued)

(58) Field of Classification Search
None
See application file for complete search history.

(56) References Cited

U.S. PATENT DOCUMENTS 3,239,706 A 3/1966 Farrell
4,057,725 A 11/1977 Wagner
(Continued)

FOREIGN PATENT DOCUMENTS

DE 3840398 A1 6/1989
DE 4432205 C1 1/1996
(Continued)

OTHER PUBLICATIONS

International Search Report for PCT/US23/74111, Mar. 12, 2024.
(Continued)

*Primary Examiner* — Thomas R Artman
(74) *Attorney, Agent, or Firm* — Novel IP

(57) ABSTRACT

A system for inspecting an object, includes: a source of X-ray radiation; a horizontal array of detectors, wherein the source and the array of detectors are positioned substantially on a first plane; a platform configured to rotate as well as translate in a vertical trajectory, wherein the platform is positioned on a second plane between the source and the array of detectors, and wherein the object is disposed on the platform; and a computing device configured to: cause the source to fire a substantially horizontal fan beam in a third plane, wherein the third plane is above a top of the object; acquire calibration data from the array of detectors while the third plane is above the top of the object; cause the platform to simultaneously rotate and raise the object vertically upwards; acquire scan data of the object; and generate a three dimensional scan image of the object.

31 Claims, 11 Drawing Sheets

100
118
125 120
130
115

(51) Int. Cl.
    *G01N 23/087*       (2018.01)
    *G01N 23/10*        (2018.01)

(52) U.S. Cl.
    CPC .............. *G01N 2223/1016* (2013.01); *G01N 2223/201* (2013.01); *G01N 2223/206* (2013.01); *G01N 2223/303* (2013.01); *G01N 2223/306* (2013.01); *G01N 2223/309* (2013.01); *G01N 2223/3304* (2013.01); *G01N 2223/3306* (2013.01); *G01N 2223/3307* (2013.01); *G01N 2223/3308* (2013.01); *G01N 2223/419* (2013.01); *G01N 2223/424* (2013.01); *G01N 2223/5015* (2013.01)

(56)              References Cited

U.S. PATENT DOCUMENTS

| | | | |
|---|---|---|---|
| 4,171,254 A | 10/1979 | Koenecke | |
| 4,228,353 A | 10/1980 | Johnson | |
| 4,274,005 A | 6/1981 | Yamamura | |
| 4,420,382 A | 12/1983 | Riedl | |
| 4,422,177 A * | 12/1983 | Mastronardi | A61B 6/0487 |
| | | | 378/10 |
| 4,531,226 A | 7/1985 | Peschmann | |
| 4,672,649 A | 6/1987 | Rutt | |
| 4,675,890 A | 6/1987 | Plessis | |
| 4,719,645 A | 1/1988 | Yamabe | |
| 4,868,856 A | 9/1989 | Frith | |
| 4,887,604 A | 12/1989 | Shefer | |
| 5,056,124 A | 10/1991 | Kakimoto | |
| 5,159,234 A | 10/1992 | Wegmann | |
| 5,247,556 A | 9/1993 | Eckert | |
| 5,259,014 A | 11/1993 | Brettschneider | |
| 5,329,180 A | 7/1994 | Popli | |
| 5,467,377 A | 11/1995 | Dawson | |
| 5,600,303 A | 2/1997 | Husseiny | |
| 5,633,907 A | 5/1997 | Gravelle | |
| 5,796,802 A | 8/1998 | Gordon | |
| 5,798,972 A | 8/1998 | Lao | |
| 5,838,758 A | 11/1998 | Krug | |
| 5,841,831 A | 11/1998 | Hell | |
| 5,879,807 A | 3/1999 | Inoue | |
| 5,943,388 A | 8/1999 | Tuemer | |
| 6,088,423 A | 7/2000 | Krug | |
| 6,240,157 B1 | 5/2001 | Danielsson | |
| 6,324,243 B1 | 11/2001 | Edic | |
| 6,417,797 B1 | 7/2002 | Cousins | |
| 6,542,580 B1 | 4/2003 | Carver | |
| 6,556,651 B1 | 4/2003 | Thomson | |
| 6,628,745 B1 * | 9/2003 | Annis | A61B 6/032 |
| | | | 378/57 |
| 6,674,838 B1 | 1/2004 | Barrett | |
| 7,062,011 B1 | 6/2006 | Tybinkowski | |
| 7,224,763 B2 | 5/2007 | Naidu | |
| 7,349,525 B2 | 3/2008 | Morton | |
| 7,356,115 B2 * | 4/2008 | Ford | G01V 5/226 |
| | | | 378/57 |
| 7,372,934 B2 | 5/2008 | De | |
| 7,440,543 B2 | 10/2008 | Morton | |
| 7,505,563 B2 | 3/2009 | Morton | |
| 7,512,215 B2 | 3/2009 | Morton | |
| 7,564,939 B2 | 7/2009 | Morton | |
| 7,636,638 B2 | 12/2009 | Russ | |
| 7,664,230 B2 | 2/2010 | Morton | |
| 7,684,538 B2 | 3/2010 | Morton | |
| 7,724,868 B2 | 5/2010 | Morton | |
| 7,728,397 B2 | 6/2010 | Gorrell | |
| 7,835,495 B2 | 11/2010 | Harding | |
| 7,868,665 B2 * | 1/2011 | Tuemer | H03F 3/45475 |
| | | | 327/51 |
| 7,869,566 B2 * | 1/2011 | Edic | G01V 5/226 |
| | | | 378/57 |
| 7,876,879 B2 | 1/2011 | Morton | |
| 7,903,789 B2 | 3/2011 | Morton | |
| 7,929,663 B2 | 4/2011 | Morton | |
| 7,949,101 B2 | 5/2011 | Morton | |
| 8,000,436 B2 * | 8/2011 | Seppi | G01V 5/226 |
| | | | 378/57 |
| 8,085,897 B2 | 12/2011 | Morton | |
| 8,094,784 B2 | 1/2012 | Morton | |
| 8,135,110 B2 | 3/2012 | Morton | |
| 8,204,173 B2 | 6/2012 | Betcke | |
| 8,223,919 B2 | 7/2012 | Morton | |
| 8,243,876 B2 | 8/2012 | Morton | |
| 8,331,535 B2 | 12/2012 | Morton | |
| 8,451,974 B2 | 5/2013 | Morton | |
| 8,552,722 B2 | 10/2013 | Lionheart | |
| 8,559,592 B2 | 10/2013 | Betcke | |
| 8,625,735 B2 | 1/2014 | Morton | |
| 8,804,899 B2 | 8/2014 | Morton | |
| 8,824,637 B2 | 9/2014 | Morton | |
| 8,837,669 B2 | 9/2014 | Morton | |
| 8,885,794 B2 | 11/2014 | Morton | |
| 8,958,526 B2 | 2/2015 | Morton | |
| 9,001,973 B2 | 4/2015 | Morton | |
| 9,020,095 B2 | 4/2015 | Morton | |
| 9,046,465 B2 | 6/2015 | Thompson | |
| 9,048,061 B2 | 6/2015 | Morton | |
| 9,093,245 B2 | 7/2015 | Morton | |
| 9,113,839 B2 | 8/2015 | Morton | |
| 9,158,030 B2 | 10/2015 | Morton | |
| 9,183,647 B2 | 11/2015 | Morton | |
| 9,208,988 B2 | 12/2015 | Morton | |
| 9,223,049 B2 * | 12/2015 | Kotowski | G01T 7/00 |
| 9,263,225 B2 | 2/2016 | Morton | |
| 9,268,046 B2 * | 2/2016 | Carmi | G01T 1/249 |
| 9,279,901 B2 | 3/2016 | Akery | |
| 9,420,677 B2 | 8/2016 | Morton | |
| 9,442,082 B2 | 9/2016 | Morton | |
| 9,562,866 B2 | 2/2017 | Morton | |
| 9,576,766 B2 | 2/2017 | Morton | |
| 9,606,259 B2 | 3/2017 | Morton | |
| 9,618,648 B2 | 4/2017 | Morton | |
| 9,638,646 B2 | 5/2017 | Morton | |
| 9,675,306 B2 | 6/2017 | Morton | |
| 9,693,749 B2 * | 7/2017 | Ni | G01N 23/046 |
| 9,714,920 B2 | 7/2017 | Lionheart | |
| 9,726,619 B2 | 8/2017 | Thompson | |
| 9,747,705 B2 | 8/2017 | Morton | |
| 10,107,783 B2 | 10/2018 | Lionheart | |
| 10,175,381 B2 | 1/2019 | Morton | |
| 10,238,360 B2 * | 3/2019 | Song | A61B 6/582 |
| 10,295,483 B2 | 5/2019 | Morton | |
| 10,433,810 B2 * | 10/2019 | Ni | A61B 6/582 |
| 10,859,515 B2 * | 12/2020 | Huang | G01N 23/087 |
| 11,406,345 B2 * | 8/2022 | Ni | A61B 6/582 |
| 2001/0022830 A1 | 9/2001 | Sommer | |
| 2002/0075545 A1 | 6/2002 | Harrison | |
| 2002/0094064 A1 | 7/2002 | Zhou | |
| 2002/0109844 A1 | 8/2002 | Christel | |
| 2003/0091148 A1 | 5/2003 | Bittner | |
| 2003/0103212 A1 | 6/2003 | Westphal | |
| 2003/0231739 A1 | 12/2003 | Rosner | |
| 2004/0012494 A1 | 1/2004 | Lee | |
| 2004/0017224 A1 | 1/2004 | Tumer | |
| 2004/0022292 A1 | 2/2004 | Morton | |
| 2004/0066879 A1 | 4/2004 | Machida | |
| 2004/0080315 A1 | 4/2004 | Beevor | |
| 2004/0096030 A1 | 5/2004 | Banchieri | |
| 2004/0109532 A1 * | 6/2004 | Ford | G01N 23/046 |
| | | | 378/57 |
| 2004/0120454 A1 | 6/2004 | Ellenbogen | |
| 2005/0031075 A1 | 2/2005 | Hopkins | |
| 2005/0089140 A1 | 4/2005 | Mario | |
| 2005/0111610 A1 | 5/2005 | De Man | |
| 2005/0111619 A1 | 5/2005 | Bijjani | |
| 2005/0123092 A1 | 6/2005 | Mistretta | |
| 2005/0175151 A1 | 8/2005 | Dunham | |
| 2005/0276377 A1 | 12/2005 | Carol | |
| 2005/0276382 A1 | 12/2005 | Lesiak | |
| 2006/0002585 A1 | 1/2006 | Larson | |
| 2006/0008047 A1 | 1/2006 | Zhou | |
| 2006/0050842 A1 | 3/2006 | Wang | |
| 2006/0273237 A1 | 12/2006 | Thompson | |

(56)　　　　　　References Cited

U.S. PATENT DOCUMENTS

| | | |
|---|---|---|
| 2007/0009084 A1 | 1/2007 | Bhatt |
| 2007/0025512 A1 | 2/2007 | Gertsenshteyn |
| 2007/0122003 A1 | 5/2007 | Dobkin |
| 2007/0183575 A1 | 8/2007 | Lemaitre |
| 2007/0189597 A1 | 8/2007 | Limer |
| 2007/0242802 A1 | 10/2007 | Dafni |
| 2007/0258562 A1 | 11/2007 | Dinca |
| 2008/0019483 A1 | 1/2008 | Andrews |
| 2008/0043912 A1 | 2/2008 | Harding |
| 2008/0056436 A1 | 3/2008 | Pack |
| 2008/0123803 A1 | 5/2008 | De Man |
| 2008/0130974 A1 | 6/2008 | Xu |
| 2008/0237480 A1 | 10/2008 | Robinson |
| 2009/0003514 A1 | 1/2009 | Edic |
| 2009/0022264 A1 | 1/2009 | Zhou |
| 2009/0034792 A1 | 2/2009 | Kennison |
| 2009/0067575 A1* | 3/2009 | Seppi ..................... G01V 5/226 |
| | | 378/57 |
| 2009/0128557 A1 | 5/2009 | Finlayson |
| 2009/0159451 A1 | 6/2009 | Tomantschger |
| 2009/0185660 A1 | 7/2009 | Zou |
| 2009/0265386 A1 | 10/2009 | March |
| 2009/0274277 A1 | 11/2009 | Morton |
| 2009/0283690 A1* | 11/2009 | Bendahan .............. G01V 5/234 |
| | | 376/159 |
| 2009/0316855 A1 | 12/2009 | Morton |
| 2010/0020934 A1 | 1/2010 | Morton |
| 2010/0025796 A1 | 2/2010 | Dabiran |
| 2010/0061512 A1 | 3/2010 | Edic |
| 2010/0172476 A1 | 7/2010 | Morton |
| 2010/0329532 A1 | 12/2010 | Masuda |
| 2011/0188725 A1 | 8/2011 | Yu |
| 2012/0219116 A1 | 8/2012 | Thompson |
| 2013/0170611 A1 | 7/2013 | Beckmann |
| 2013/0251098 A1 | 9/2013 | Morton |
| 2013/0251105 A1* | 9/2013 | Kotowski .............. G01N 23/04 |
| | | 378/204 |
| 2013/0264483 A1 | 10/2013 | Abenaim |
| 2014/0023181 A1 | 1/2014 | Noshi |
| 2014/0140469 A1* | 5/2014 | Carmi .................... A61B 6/585 |
| | | 378/207 |
| 2014/0211916 A1 | 7/2014 | Morton |
| 2014/0342631 A1 | 11/2014 | Morton |
| 2015/0204989 A1* | 7/2015 | Ni ........................ G01N 23/046 |
| | | 378/207 |
| 2015/0325010 A1 | 11/2015 | Bedford |
| 2015/0357148 A1 | 12/2015 | Morton |
| 2016/0003965 A1 | 1/2016 | Chen |
| 2016/0003967 A1 | 1/2016 | Chen |
| 2016/0343533 A1 | 11/2016 | Morton |
| 2016/0372309 A1 | 12/2016 | Steiner |
| 2017/0042498 A1* | 2/2017 | Song ..................... A61B 6/582 |
| 2017/0161922 A1 | 6/2017 | Morton |
| 2017/0251995 A1* | 9/2017 | Ni .......................... A61B 6/582 |
| 2017/0276620 A1* | 9/2017 | Huang ................. G01N 23/046 |
| 2018/0038988 A1 | 2/2018 | Morton |
| 2018/0128754 A1 | 5/2018 | Thompson |
| 2018/0299580 A1 | 10/2018 | Morton |
| 2019/0178821 A1 | 6/2019 | Morton |
| 2020/0022669 A1* | 1/2020 | Ni ........................ G06T 11/005 |
| 2021/0244374 A1 | 8/2021 | Zhao |
| 2022/0390391 A1* | 12/2022 | Bendahan .............. G01N 23/05 |
| 2024/0094147 A1* | 3/2024 | Procter ................. G01N 23/10 |

FOREIGN PATENT DOCUMENTS

| | | |
|---|---|---|
| DE | 4436688 A1 | 4/1996 |
| DE | 19745998 A1 | 3/1999 |
| DE | 19907758 A1 | 8/1999 |
| DE | 10036210 A1 | 11/2001 |
| DE | 10319549 B3 | 12/2004 |
| EP | 0142249 A2 | 5/1985 |
| EP | 0432568 | 6/1991 |
| EP | 0531993 A1 | 3/1993 |
| EP | 0584871 A1 | 3/1994 |
| EP | 0924742 A2 | 6/1999 |
| EP | 0930046 A2 | 7/1999 |
| EP | 1277439 A1 | 1/2003 |
| FR | 2328280 A1 | 5/1977 |
| GB | 1272498 A | 4/1972 |
| GB | 2360405 A | 9/2001 |
| GB | 2423687 A | 8/2006 |
| JP | H0479128 A | 3/1992 |
| JP | H05135721 A | 6/1993 |
| JP | H05182617 A | 7/1993 |
| JP | H05290768 A | 11/1993 |
| JP | H10211196 A | 8/1998 |
| JP | 2001176408 A | 6/2001 |
| JP | 2008166059 A | 7/2008 |
| SU | 1022236 A1 | 6/1983 |
| WO | 9701771 A | 1/1997 |
| WO | 9718462 A1 | 5/1997 |
| WO | 9960387 A2 | 11/1999 |
| WO | 03048808 A | 6/2003 |
| WO | 03051201 A2 | 6/2003 |
| WO | 2004010127 A1 | 1/2004 |
| WO | 2004097456 A | 11/2004 |
| WO | 2004097888 A2 | 11/2004 |
| WO | 2004097889 A2 | 11/2004 |
| WO | 2005050405 A2 | 6/2005 |
| WO | 2006027122 A1 | 3/2006 |
| WO | 2006130630 A2 | 12/2006 |
| WO | 2007068933 A1 | 6/2007 |
| WO | 2008027703 A2 | 3/2008 |
| WO | 2009012453 A1 | 1/2009 |
| WO | 2010007375 A2 | 1/2010 |
| WO | 2010097621 A2 | 9/2010 |
| WO | 2010138574 | 12/2010 |
| WO | 2010138607 | 12/2010 |
| WO | 2010141659 A1 | 12/2010 |
| WO | 2012115629 A1 | 8/2012 |

OTHER PUBLICATIONS

International Search Report, PCT/GB2009/001760, Mar. 1, 2010, Rapiscan Systems, Inc.

International Search Report for PCT/US2010/037167, Sep. 7, 2010.

International Search Report PCT/GB2008/000116, Nov. 17, 2009.

Keevil, S.V., Lawinski, C.P. and Morton, E.J., 1987, "Measurement of the performance characteristics of anti-scatter grids.", Phys. Med. Biol., 32(3), 397-403.

Morton, E.J., Webb, S., Bateman, J.E., Clarke, L.J. and Shelton, C.G., 1990, "Three-dimensional x-ray micro-tomography for medical and biological applications.", Phys. Med. Biol., 35(7), 805-820.

Morton, E.J., Swindell, W., Lewis, D.G. and Evans, P.M., 1991, "A linear array scintillation-crystal photodiode detector for megavoltage imaging.", Med. Phys., 18(4), 681-691.

Morton, E.J., Lewis, D.G. and Swindell, W., 1988, "A method for the assessment of radiotherapy treatment precision", Brit. J. Radiol., Supplement 22, 25.

Swindell, W., Morton, E.J., Evans, P.M. and Lewis, D.G., 1991, "The design of megavoltage projection imaging systems: some theoretical aspects.", Med. Phys., 18(5), 855-866.

Morton, E.J., Evans, P.M., Ferraro, M., Young, E.F. and Swindell, W., 1991, "A video frame store facility for an external beam radiotherapy treatment simulator.", Brit. J. Radiol., 64, 747-750.

Antonuk, L.E., Yorkston, J., Kim, C.W., Huang, W., Morton, E.J., Longo, M.J. and Street, R.A., 1991, "Light response characteristics of amorphous silicon arrays for megavoltage and diagnostic imaging.", Mat. Res. Soc. Sym. Proc., 219, 531-536.

Yorkston, J., Antonuk, L.E., Morton, E.J., Boudry, J., Huang, W., Kim, C.W., Longo, M.J. and Street, R.A., 1991, "The dynamic response of hydrogenated amorphous silicon imaging pixels.", Mat. Res. Soc. Sym. Proc., 219, 173-178.

Evans, P.M., Gildersleve, J.Q., Morton, E.J., Swindell, W., Coles, R., Ferraro, M., Rawlings, C., Xiao, Z.R. and Dyer, J., 1992, "Image comparison techniques for use with megavoltage imaging systems.", Brit. J. Radiol., 65, 701-709.

(56) References Cited

OTHER PUBLICATIONS

Morton, E.J., Webb, S., Bateman, J.E., Clarke, L.J. and Shelton, C.G., 1989, "The development of 3D x-ray micro-tomography at sub 100Ã?Aum resolution with medical, industrial and biological applications.", Presentation at IEE colloquium "Medical scanning and imaging techniques of value in non-destructive testing", London, Nov. 3, 1989.

Antonuk, L.E., Boudry, J., Huang, W., McShan, D.L., Morton, E.J., Yorkston, J, Longo, M.J. and Street, R.A., 1992, "Demonstration of megavoltage and diagnostic x-ray imaging with hydrogenated amorphous silicon arrays.", Med. Phys., 19(6), 1455-1466.

Gildersleve, J.Q., Swindell, W., Evans, P.M., Morton, E.J., Rawlings, C. and Dearnaley, D.P., 1991, "Verification of patient positioning during radiotherapy using an integrated megavoltage imaging system.", in "Tumour Response Monitoring and Treatment Planning", Proceedings of the International Symposium of the W. Vaillant Foundation on Advanced Radiation Therapy, Munich, Germany, Ed A. Breit (Berlin: Springer), 693-695.

Lewis, D.G., Evans, P.M., Morton, E.J., Swindell, W. and Xiao, X.R., 1992, "A megavoltage CT scanner for radiotherapy verification.", Phys. Med. Biol., 37, 1985-1999.

Antonuk, L.E., Boudry, J., Kim, C.W., Longo, M.J., Morton, E.J., Yorkston, J. and Street, R.A., 1991, "Signal, noise and readout considerations in the development of amorphous silicon photodiode arrays for radiotherapy and diagnostic x-ray imaging.", SPIE vol. 1443 Medical Imaging V: Image Physics, 108-119.

Antonuk, L.E., Yorkston, J., Huang, W., Boudry, J., Morton, E.J., Longo, M.J. and Street, R.A., 1992, "Radiation response characteristics of amorphous silicon arrays for megavoltage radiotherapy imaging.", IEEE Trans. Nucl. Sci., 39,1069-1073.

Antonuk, L.E., Yorkston, J., Huang, W., Boudry, J., Morton, E.J., Longo, M.J. and Street, R.A., 1992, "Factors affecting image quality for megavoltage and diagnostic x-ray a-Si:H imaging arrays.", Mat. Res. Soc. Sym. Proc., 258, 1069-1074.

Antonuk, L.E., Boudry, J., Yorkston, J., Morton, E.J., Huang, W. and Street, R.A., 1992, "Development of thin-film, flat-panel arrays for diagnostic and radiotherapy imaging.", SPIE vol. 1651, Medical Imaging VI: Instrumentation, 94-105.

Yorkston, J., Antonuk, L.E., Seraji, N., Boudry, J., Huang, W., Morton, E.J., and Street, R.A., 1992, "Comparison of computer simulations with measurements from a-Si:H imaging arrays.", Mat. Res. Soc. Sym. Proc., 258, 1163-1168.

Morton, E.J., Antonuk, L.E., Berry, J.E., Boudry, J., Huang, W., Mody, P., Yorkston, J. and Longo, M.J., 1992, "A CAMAC based data acquisition system for flat-panel image array readout", Presentation at IEEE Nuclear Science Symposium, Orlando, Oct. 25-31, 1992.

Antonuk, L.E., Yorkston, J., Huang, W., Boudry, J., Morton, E.J. and Street, R.A., 1993, "Large area, flat-panel a-Si:H arrays for x-ray imaging.", SPIE vol. 1896, Medical Imaging 1993: Physics of Medical Imaging, 18-29.

Morton, E.J., Antonuk, L.E., Berry, J.E., Huang, W., Mody, P. and Yorkston, J., 1994, "A data acquisition system for flat-panel imaging arrays", IEEE Trans. Nucl. Sci., 41(4), 1150-1154.

Antonuk, L.E., Boudry, J., Huang, W., Lam, K.L., Morton, E.J., TenHaken, R.K., Yorkston, J. and Clinthorne, N.H., 1994, "Thin-film, flat-panel, composite imagers for projection and tomographic imaging", IEEE Trans. Med. Im., 13(3), 482-490.

Gildersleve, J., Dearnaley, D., Evans, P., Morton, E.J. and Swindell, W., 1994, "Preliminary clinical performance of a scanning detector for rapid portal imaging", Clin. Oncol., 6, 245-250.

Hess, R., De Antonis, P., Morton, E.J. and Gilboy, W.B., 1994, "Analysis of the pulse shapes obtained from single crystal CdZnTe radiation detectors", Nucl. Inst. Meth., A353, 76-79.

Deantonis, P., Morton, E.J., T. Menezes, 1996, "Measuring the bulk resistivity of CdZnTe single crystal detectors using a contactless alternating electric field method", Nucl. Inst. Meth., A380, 157-159.

Deantonis, P., Morton, E.J., Podd, F., 1996, "Infra-red microscopy of CdZnTe radiation detectors revealing their internal electric field structure under bias", IEEE Trans. Nucl. Sci., 43(3), 1487-1490.

Tavora, L.M.N., Morgado, R.E., Estep, R.J., Rawool-Sullivan, M., Gilboy, W.B. and Morton, E.J., 1998, "One-sided imaging of large, dense, objects using the 511 keV photons from induced pair production", IEEE Trans. Nucl. Sci., 45(3), 970-975.

Morton, E.J., 1995, "Archaeological potential of computerised tomography", Presentation at IEE Colloquium on "NDT in archaeology and art", London, May 25, 1995.

Tavora, L.M.N. and Morton, E.J., 1998, "Photon production using a low energy electron expansion of the EGS4 code system ", Nucl. Inst. Meth., B143, 253-271.

Patel, D.C. and Morton, E.J., 1998, "Analysis of improved adiabatic pseudo-domino logic family", Electron. Lett., 34(19), 1829-1830.

Kundu, A and Morton, E.J., 1999, "Numerical simulation of argon-methane gas filled proportional counters", Nucl. Inst. Meth., A422, 286-290.

Luggar, R.D., Key, M.J., Morton, E.J. and Gilboy, W.B., 1999, "Energy dispersive X-ray scatter for measurement of oil/water ratios ", Nucl. Inst. Meth., A422, 938-941.

Morton, E.J., Crockett, G.M., Sellin, p. J. and DeAntonis, P., 1999, "The charged particle response of CdZnTe radiation detectors", Nucl. Inst. Meth., A422, 169-172.

Morton, E.J., Clark, R.J. and Crowley, C., 1999, "Factors affecting the spectral resolution of scintillation detectors", Nucl. Inst. Meth., A422, 155-158.

Morton, E.J., Caunt, J.C., Schoop, K., Swinhoe, M., 1996, "A new handheld nuclear material analyser for safeguards purposes", Presentation at INMM annual meeting, Naples, Florida, Jul. 1996.

Hepworth, S., McJury, M., Oldham, M., Morton, E.J. and Doran, S.J., 1999, "Dose mapping of inhomogeneities positioned in radiosensitive polymer gels", Nucl. Inst. Meth., A422, 756-760.

Morton, E.J., Luggar, R.D., Key, M.J., Kundu, A., Tavora, L.M.N. and Gilboy, W.B., 1999, "Development of a high speed X-ray tomography system for multiphase flow imaging", IEEE Trans. Nucl. Sci., 46 III(1), 380-384.

Tavora, L.M.N., Morton, E.J., Santos, F.P. and Dias, T.H.V.T., 2000, "Simulation of X-ray tubes for imaging applications", IEEE Trans. Nucl. Sci., 47, 1493-1497.

Tavora, L.M.N., Morton, E.J. and Gilboy, W.B., 2000, "Design considerations for transmission X-ray tubes operated at diagnostic energies", J. Phys. D: Applied Physics, 33(19), 2497-2507.

Morton, E.J., Hossain, M.A., DeAntonis, P. and Ede, A.M.D., 2001, "Investigation of Au—CdZnTe contacts using photovoltaic measurements", Nucl. Inst. Meth., A458, 558-562.

Ede, A.M.D., Morton, E.J. and DeAntonis, P., 2001, "Thin-film CdTe for imaging detector applications", Nucl. Inst. Meth., A458, 7-11.

Tavora, L.M.N., Morton, E.J. and Gilboy, W.B., 2001, "Enhancing the ratio of fluorescence to bremsstrahlung radiation in X-ray tube spectra", App. Rad. and Isotopes, 54(1), 59-72.

Menezes, T. and Morton, E.J., 2001, "A preamplifier with digital output for semiconductor detectors", Nucl. Inst. Meth. A., A459, 303-318.

Johnson, D.R., Kyriou, J., Morton, E.J., Clifton, A.C. Fitzgerald, M. and MacSweeney, J.E., 2001, "Radiation protection in interventional radiology", Clin. Rad., 56(2), 99-106.

Tavora, L.M.N., Gilboy, W.B. and Morton, E.J., 2001, "Monte Carlo studies of a novel X-ray tube anode design", Rad. Phys. and Chem., 61, 527-529.

"Morton, E.J., 1998, "Is film dead: the flat plate revolution", Keynote Talk, IPEM Annual Conference, Brighton, Sep. 14-17, 1998"\.

Luggar, R.D., Morton, E.J., Jenneson, P.M. and Key, M.J., 2001, "X-ray tomographic imaging in industrial process control", Rad. Phys. Chem., 61, 785-787.

Luggar, R.D., Morton, E.J., Key, M.J., Jenneson, P.M. and Gilboy, W.B., 1999, "An electronically gated multi-emitter X-ray source for high speed tomography", Presentation at SPIE Annual Meeting, Denver, Jul. 19-23, 1999.

Gregory, P.J., Hutchinson, D.J., Read, D.B., Jenneson, P.M., Gilboy, W.B. and Morton, E.J., 2001, "Non-invasive imaging of roots with high resolution X-ray microtomography", Plant and Soil, 255(1), 351-359.

(56)            References Cited

OTHER PUBLICATIONS

Kundu, A., Morton, E.J., Key, M.J. and Luggar, R.D., 1999, "Monte Carlo simulations of microgap gas-filled proportional counters", Presentation at SPIE Annual Meeting, Denver, Jul. 19-23, 1999.

Hossain, M.A., Morton, E.J., and Ozsan, M.E., 2002, "Photo-electronic investigation of CdZnTe spectral detectors", IEEE Trans. Nucl. Sci, 49(4), 1960-1964.

Panman, A., Morton, E.J., Kundu, A and Sellin, P.J., 1999, "Optical Monte Carlo transport in scintillators", Presentation at SPIE Annual Meeting, Denver, Jul. 19-23, 1999.

Jenneson, P.M., Gilboy, W.B., Morton, E.J., and Gregory, P.J., 2003, "An X-ray micro-tomography system optimised for low dose study of living organisms", App. Rad. Isotopes, 58, 177-181.

Key, M.J., Morton, E.J., Luggar, R.D. and Kundu, A., 2003, "Gas microstrip detectors for X-ray tomographic flow imaging", Nucl. Inst. Meth., A496, 504-508.

Jenneson, P.M., Luggar, R.D., Morton, E.J., Gundogdu, O, and Tuzun, U, 2004, "Examining nanoparticle assemblies using high spatial resolution X-ray microtomography", J. App. Phys, 96(5), 2889-2894.

Tavora, L.M., Gilboy, W.B. and Morton, E.J., 2000, "Influence of backscattered electrons on X-ray tube output", Presentation at SPIE Annual Meeting, San Diego, Jul. 30-Aug. 3, 2000.

Wadeson, N., Morton, E.J., and Lionheart, W.B., 2010, "Scatter in an uncollimated x-ray CT machine based on a Geant4 Monte Carlo simulation", SPIE Medical Imaging 2010: Physics of Medical Imaging, Feb. 15-18, 2010, San Diego, USA.

Morton, E.J., 2010, "Position sensitive detectors in security: Users perspective", Invited talk, STFC meeting on position sensitive detectors, RAL, May 2010.

International Search Report, PCT/US2012/40923, Sep. 21, 2012, Rapiscan Systems, Inc.

STMicroelectronics: "Dual Full-Bridge Driver", Datasheet for L298, 2000, pp. 1-13, XP002593095.

H. Bruder, C. Suess, K. Stierstorfer, "Efficient extended field of view (eFOV) reconstruction techniques for multi-slice helical CT," Proc. SPIE 6913, Medical Imaging 2008: Physics of Medical Imaging, 69132E, (Mar. 18, 2008).

International Search Report for PCT/US18/27872, Jul. 23, 2018.

International Search Report for PCT/GB2004/001729, Aug. 12, 2004.

International Search Report for PCT/GB2004/001741, Mar. 3, 2005.

International Search Report for PCT/GB2004/001731, May 27, 2005.

International Search Report for PCT/GB2004/001732, Feb. 25, 2005.

International Search Report for PCT/GB2004/1751, Mar. 21, 2005.

International Search Report for PCT/GB2004/001747, Augsut 10, 2004.

International Search Report for PCT/GB2006/004684, May 23, 2007.

International Search Report for PCT/GB2010/050125, Sep. 1, 2010.

International Search Report for PCT/GB2009/051178, May 11, 2010.

International Search Report for PCT/GB2010/050318, Jul. 11, 2011.

International Search Report for PCT/US2010/036183, Aug. 20, 2010.

International Search Report for PCT/US2010/036221, Aug. 23, 2010.

International Search Report for PCT/US2010/036179, Aug. 30, 2010.

International Search Report for PCT/US2010/041871, Oct. 4, 2010.

International Search Report for PCT/US2011/025777, Jul. 26, 2011.

International Search Report for PCT/US2018/063651, Feb. 25, 2019.

* cited by examiner

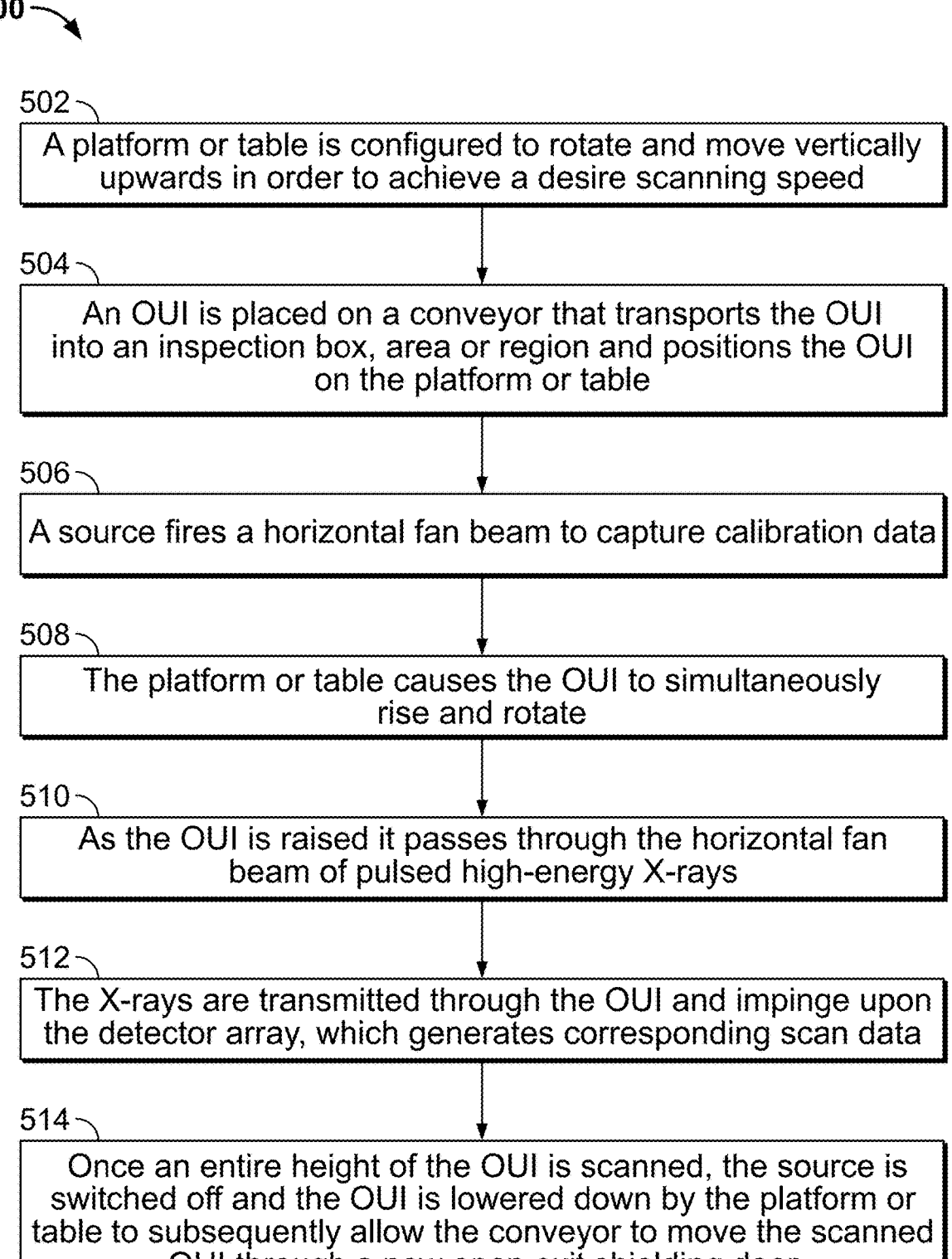

502
A platform or table is configured to rotate and move vertically upwards in order to achieve a desire scanning speed 504
An OUI is placed on a conveyor that transports the OUI into an inspection box, area or region and positions the OUI on the platform or table 506
A source fires a horizontal fan beam to capture calibration data 508
The platform or table causes the OUI to simultaneously rise and rotate 510
As the OUI is raised it passes through the horizontal fan beam of pulsed high-energy X-rays 512
The X-rays are transmitted through the OUI and impinge upon the detector array, which generates corresponding scan data 514
Once an entire height of the OUI is scanned, the source is switched off and the OUI is lowered down by the platform or table to subsequently allow the conveyor to move the scanned OUI through a now open exit shielding door

FIG. 5

SYSTEMS AND METHODS FOR GENERATING HIGH-ENERGY THREE-DIMENSIONAL COMPUTED TOMOGRAPHY IMAGES OF BULK MATERIALS

CROSS-REFERENCE

The present specification relies on U.S. Patent Provisional Application No. 63/375,900, titled "Systems and Methods for Generating High-Energy Three-Dimensional Computer Tomography Images of Bulk Materials" and filed on Sep. 16, 2022, for priority. The above-mentioned application is herein incorporated by reference in its entirety.

FIELD

The present specification is related generally to the field of X-ray inspection. More specifically, the present specification is related to systems and methods for moving an object vertically in a helical trajectory past a horizontal fan beam of X-rays in order to generate a three-dimensional scan image of the object.

BACKGROUND

It has become evident in recent years that the approach adopted for inspection of personnel luggage, both "carry on" and "hold" baggage, is insufficient for fully characterizing the contents of larger aviation packages. Unit Load Devices (ULDs) are containers used to load luggage, freight, and mail on wide body aircrafts. ULDs range in size, but are typically no larger than 2 m in width, 1 m in length and about 1.5 m in height. Such large dimensions require X-ray penetration power far greater than that afforded by <200 keV source solutions employed in baggage scanners. Even up to 1 MeV scanning solutions are limited by a penetration capability of <100 mm steel equivalent, which prevents complete inspection of high-density, or highly packed, large ULD type containers.

Air Cargo operations also require the use of dual or multi-sided inspection technologies in order to provide operators with a complete visualization of the object under inspection and the potential threat or contraband materials within. This requirement is of particular importance and benefit when considering larger, more heavily packed and dense cargo, where objects can overlap and "clutter" the inspection view from many angles. Indeed, when considering checked baggage, where the most stringent of ECAC (European Civil Aviation Conference) regulations (and equivalent TSA (USA Transportation Security Administration) regulations) are in place, most airports are required to utilize CT (Computed Tomography) imaging technologies.

CT imaging for items up to and including those of personnel hold luggage can be achieved using similar energies to those of hand-luggage scanners, or in the energy range of <200 keV. This is due in part to the maximum size of the bags under inspection and in part to the typical low-density materials that people pack into their travel bags—that is, clothing, toiletries, and other typical consumer items. However, for larger consignments that may include much denser and closely packed objects such as, for example, lithium batteries, food stuffs, and electronics equipment, a 200 keV source does not provide sufficient penetration capabilities to adequately image the package.

Recently, there has been an increase observed in the shipment of drugs contained within palletized food stuffs, therefore a similar solution to that of the above-described market sector is required to provide complete inspection of palletized freight. ISO guidelines recommend that pallets are no larger in size than 1100 mm×1220 mm×1830 mm (length×width×height). For transportation of relatively high-density fruits, with high packing fractions, a penetration thickness of 1.1 m can correspond to an equivalent steel thickness of upwards of 300 mm. Such penetrative capability requires the use of high-energy solutions in order to achieve the necessary contrast and detection capabilities for inspection.

This requirement introduces a number of complexities in the solution that can be adopted to provide 3D imaging capabilities, in addition to driving significant additional cost in the increased technical capability of the imaging solution and the management and shielding of the larger X-ray dose emission. The majority of CT imaging solutions rely on the ability to rotate the X-ray source and detector assemblies at high speed. This works well for low-profile X-ray sources, such as tubes or simple emitter devices, but does not scale well to high-energy sources in the ~6 MeV range. Similarly, static CT imaging devices, which employ multiple individual X-ray sources, do not provide a comparable solution that can be sought with the much larger and unwieldly MeV solutions.

Accordingly, there is a need for an X-ray imaging system and method that incorporates fixed-inspection hardware, while providing a 3D image of the object under inspection. There is also a need for the X-ray imaging system and method to rely upon motion of the object under inspection, eliminating the need to move the inspection hardware and the need to employ multiple X-ray source and detector configurations, as the many angles at which the object is imaged are generated through the motion of the object itself.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification is directed to a system for inspecting an object, comprising: a source of X-ray radiation; a horizontal array of detectors, wherein the source and the array of detectors are positioned substantially on a first plane; a platform configured to rotate and configured to translate in a vertical trajectory, wherein the platform is positioned on a second plane between the source and the array of detectors, and wherein the platform is adapted to receive and support the object; and a computing device configured to: cause the source to fire a substantially horizontal fan beam of X-rays in a third plane, wherein the third plane is above a top of the object; acquire calibration data from the array of detectors while the third plane is above the top of the object; cause the platform to simultaneously rotate and raise the object vertically upwards; acquire scan data of the object; and use the calibration and scan data to generate a three dimensional scan image of the object.

Optionally, the object or object under inspection is a densely packed Unit Load Device or a pallet.

Optionally, the source is a LINAC or Betatron configured to operate at an energy ranging from approximately 750 keV and up to 10 MeV. Optionally, the source has a dose output ranging from 0.01 Gy/min to 30 Gy/min. Optionally, the source includes a secondary collimator configured to generate the horizontal fan beam of X-rays.

Optionally, the array of detectors is 1 to 6 channels or pixels tall. Still optionally, the array of detectors is 8 to 12 channels or pixels tall. Still optionally, the array of detectors has channels or pixels ranging from 1 to 20.

Optionally, the system has a magnification of approximately 1.525 and a reconstructed resolution of about 22 mm per slice.

Optionally, the system has a throughput of at least 5 units per hour.

Optionally, the platform includes a first drive mechanism configured to rotate the object at a first rotational speed and a second drive mechanism configured to rotate the object at a second rotational speed. Optionally, the first rotational speed ranges from about 5 minutes a rotation to 30 seconds a rotation, and wherein the second speed ranges from about 30 seconds a rotation to 0.5 seconds a rotation.

Optionally, the platform further includes a corkscrew/scissor lift that raises or lowers the object.

Optionally, the platform further includes a hoist that is raised and lowered though a piston assembly for raising or lowering the object.

In some embodiments, the present specification is directed to a method of inspecting an object using a platform positioned between a source of X-ray radiation and a horizontal detector array, the method comprising: transporting the object over a conveyor to position the object on the platform; triggering the source to fire a horizontally diverging fan beam, wherein a plane of the fan beam is above a top surface of the object; acquiring calibration data using the detector array; causing the platform to rotate as well as rise vertically upwards in order to move the object in a substantially helical trajectory; acquiring scan data by exposing the moving object to the fan beam; and generating, using the calibration and scan data, a three dimensional scan image of the object.

Optionally, the object is a densely packed Unit Load Device or a pallet.

Optionally, the source is a LINAC or Betatron configured to operate at an energy ranging from approximately 750 keV and up to 10 MeV. Optionally, the source has a dose output ranging from 0.01 Gy/min to 30 Gy/min. Optionally, the source includes a secondary collimator configured to generate the horizontal fan beam of X-rays.

Optionally, the detector array is 1 to 6 channels or pixels tall. Optionally, the detector array is 8 to 10 channels or pixels tall. Optionally, the detector array has channels or pixels ranging from 1 to 20.

Optionally, the method enables a magnification of approximately 1.525 and a reconstructed resolution of about 22 mm per slice.

Optionally, the method enables has a throughput of at least 5 units per hour.

Optionally, the platform includes a first drive mechanism configured to rotate the object at a first rotational speed and a second drive mechanism configured to rotate the object at a second rotational speed. Optionally, the first rotational speed ranges from about 5 minutes a rotation to 30 seconds a rotation, and wherein the second speed ranges from about 30 seconds a rotation to 0.5 seconds a rotation.

Optionally, the platform further includes a corkscrew/scissor lift that raises or lowers the object. Optionally, the platform further includes a hoist that is raised and lowered though a piston assembly for raising or lowering the object.

Optionally, the method further comprises causing the platform to move vertically downwards when an entire height of the object has been scanned; and transporting the object away from the platform while simultaneously conveying another object towards the platform.

In some embodiments, the present specification is directed to a system for inspecting an object, comprising: a source of X-ray radiation; a horizontal array of detectors, wherein the source and the array of detectors are positioned substantially on a first plane, and wherein the array of detectors includes channels or pixels ranging from 1 to 20; a platform configured to rotate as well as translate in a vertical trajectory, wherein the platform is positioned on a second plane between the source and the array of detectors, and wherein the object is disposed on the platform; and a computing device configured to: cause the source to fire a substantially horizontal fan beam of X-rays in a third plane, wherein the third plane is above a top of the object; acquire calibration data from the array of detectors while the third plane is above the top of the object; cause the platform to simultaneously rotate and raise the object vertically upwards; acquire scan data of the object; use the calibration and scan data in order to generate a three dimensional scan image of the object; and move the platform vertically downwards to the second plane once an entire height of the object has been irradiated with the fan beam.

Optionally, the object is a densely packed Unit Load Device or a pallet.

Optionally, the platform does not rotate while moving vertically downwards.

Optionally, the platform continues to rotate while moving vertically downwards.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 3C is a perspective view of the first configuration of the detector array shown in FIG. 3A, in accordance with some embodiments of the present specification;

FIG. 5 is a flowchart of a plurality of exemplary steps of a method for operating the system installed within an enclosure, in accordance with a first embodiment of the present specification.

DETAILED DESCRIPTION

Figure 1A:
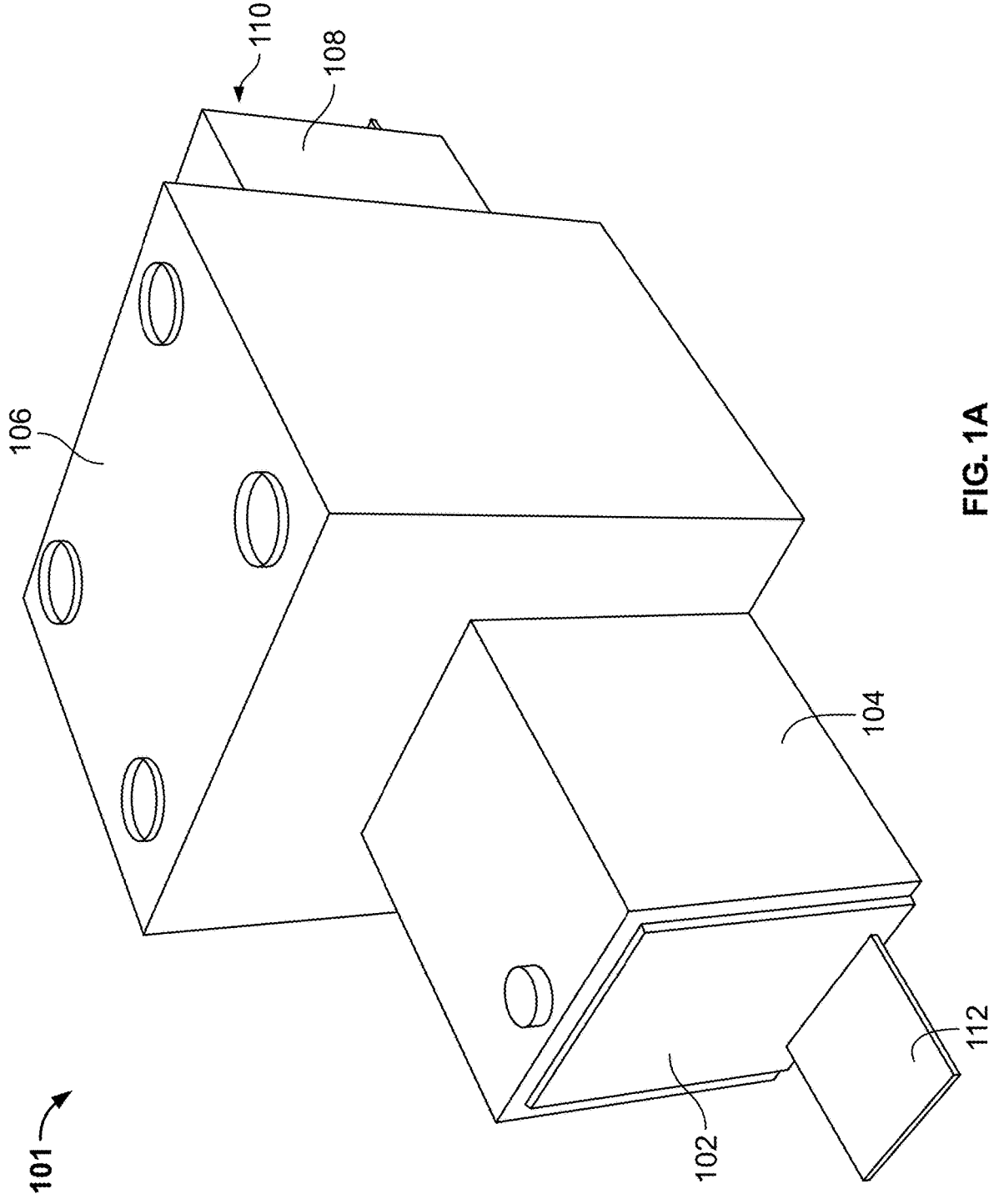
FIG. 1A is a perspective view of a central scan enclosure or housing of an X-ray inspection system, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Overview

FIG. 1A is a perspective view of an enclosure or housing 101 of an X-ray inspection system 100 (FIG. 1B), in accordance with some embodiments of the present specification. The enclosure 101 has an entrance shielding door 102 of an entry tunnel 104 that leads to an inspection area or region 106, which is also referred to as an inspection box or central scan enclosure, in embodiments. The inspection area, region, or central scan enclosure 106 further transitions into an exit tunnel 108 that has an exit shielding door 110. In order to conduct a scan, a conveyor 112 is configured to transport an object under inspection (OUI) 125 (FIG. 1B) through the entrance door 102 and the entry tunnel 104 so as to position the OUI 125 in the inspection area or region 106. The OUI 125, after being scanned in the inspection area, region, or central scan enclosure 106, is transported by the conveyor 112 to the exit tunnel 108 and out through the exit door 110.

Figure 1B:
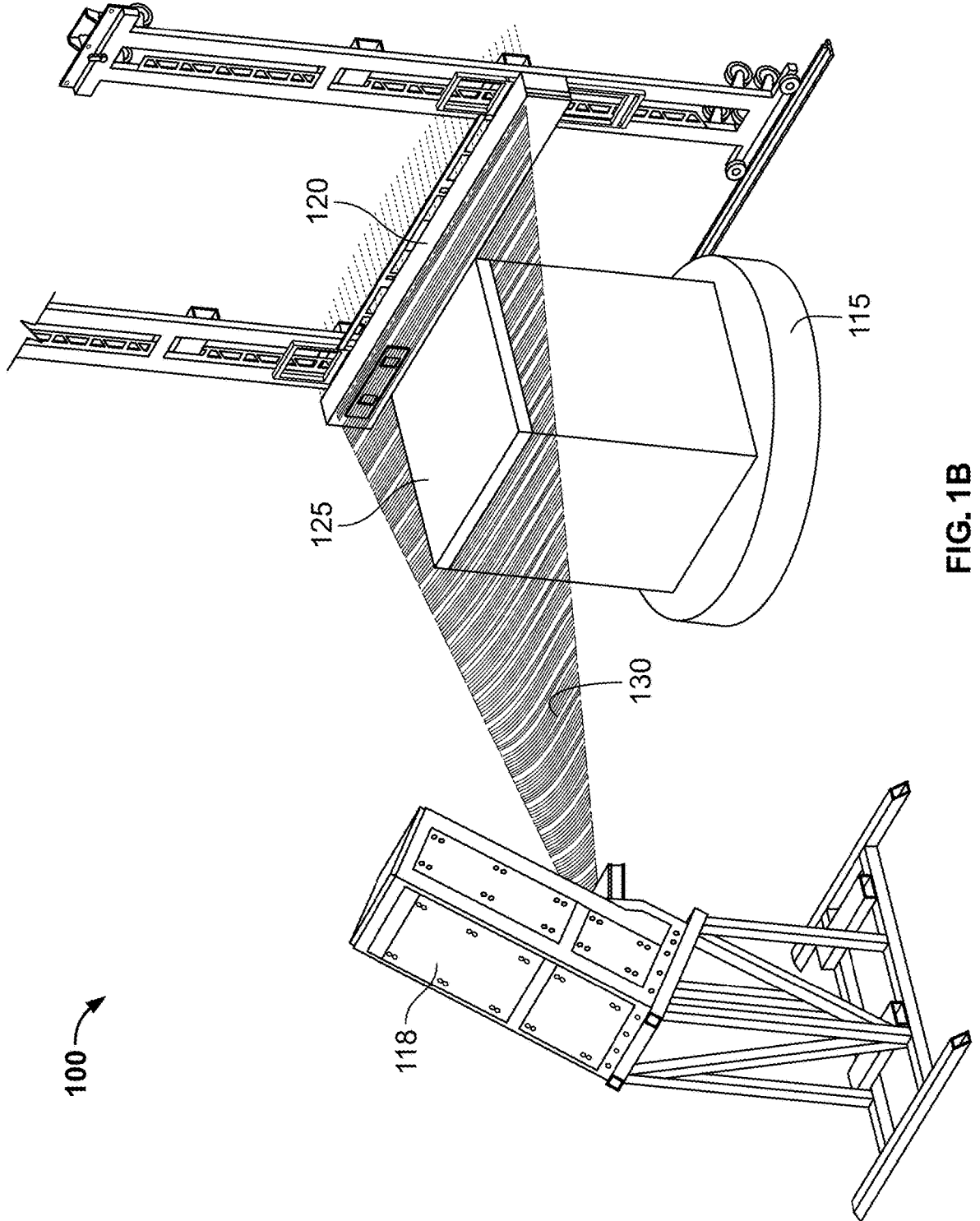
FIG. 1B is an illustration of the X-ray inspection system, in accordance with some embodiments of the present specification.

FIG. 1B is an illustration of the X-ray inspection system 100, in accordance with some embodiments of the present specification. The x-ray inspection system 100 is installed within the central scan enclosure 106 (in the inspection area or region) of the housing enclosure 101. The system 100 comprises a platform or table 115 positioned between a high dose, high-energy X-ray radiation source 118 and a detector array 120. The source 118 and detector array 120 are positioned at a height above a floor of the inspection area or region 106 while the platform or table 115 is positioned on or proximate the floor of the inspection area, region, or central scan enclosure 106. Stated differently, the platform or table 115 is positioned on a first plane while the source 118 and detector array 120 are positioned approximately on a second plane, wherein the second plane is at a height above the first plane.

Figures 3A, 3B:
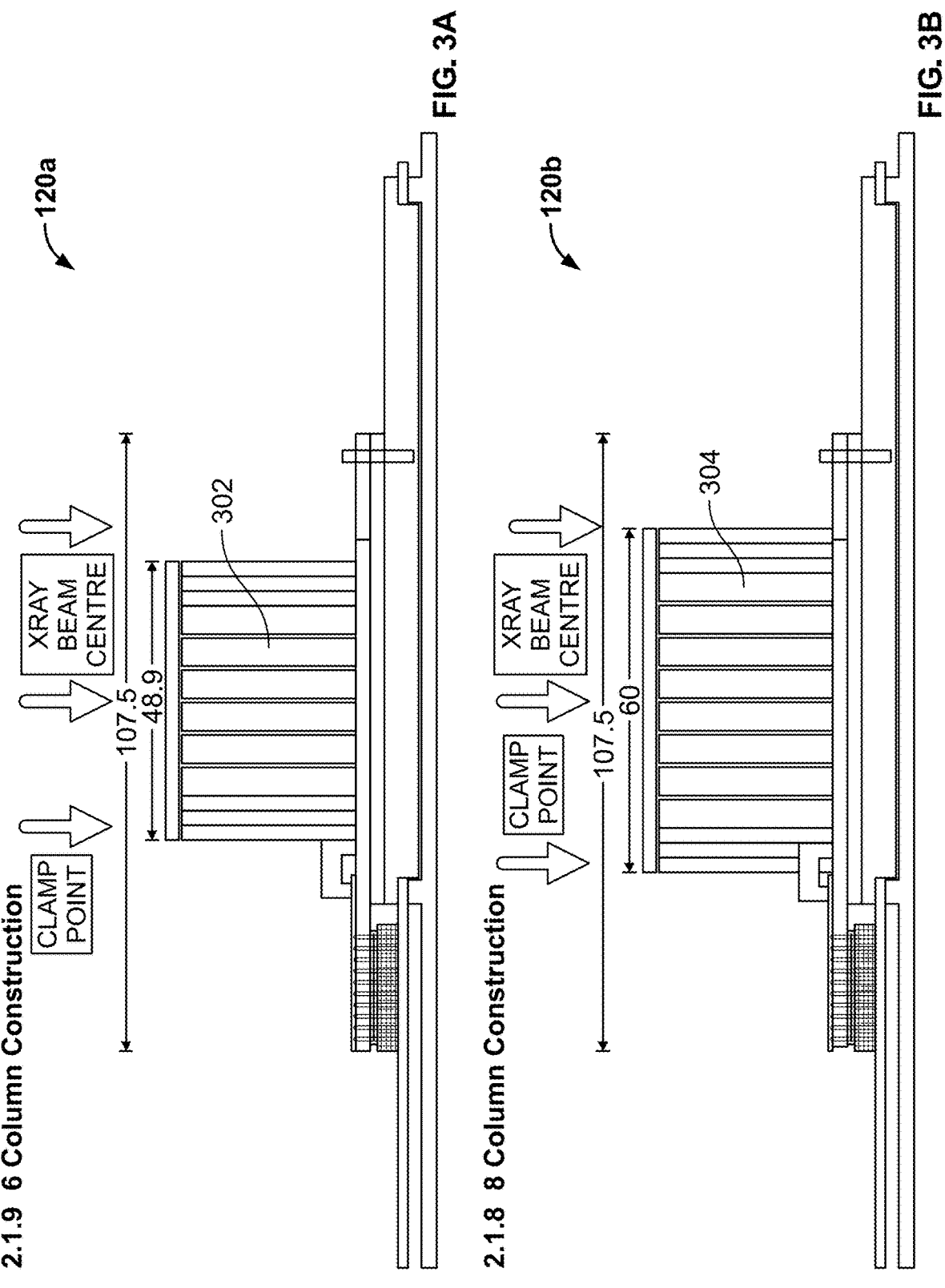
FIG. 3A is a block diagram illustration showing a first configuration of a detector array, in accordance with some embodiments of the present specification.
FIG. 3B is a block diagram illustration showing a second configuration of a detector array, in accordance with some embodiments of the present specification.
Figure 3C:
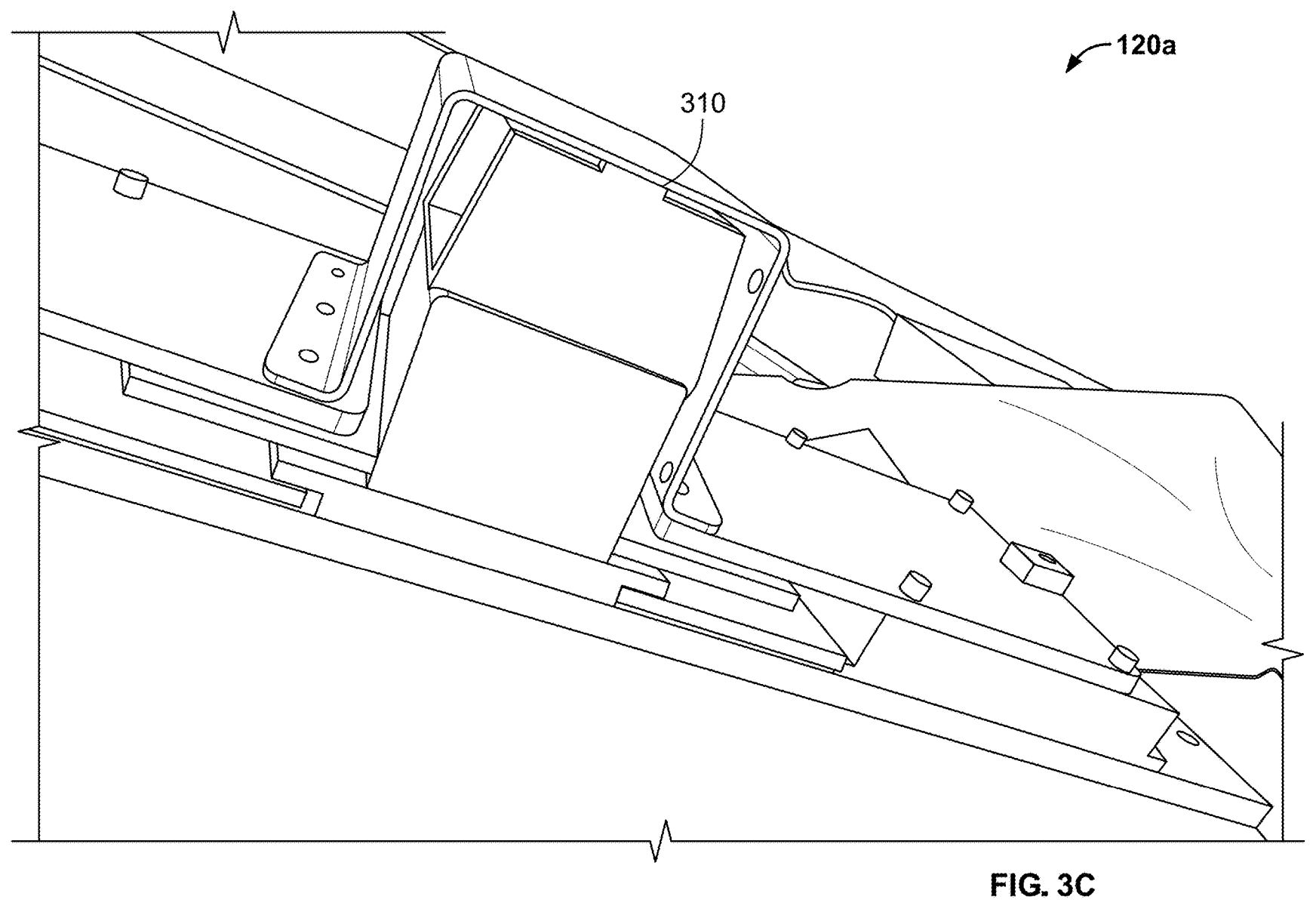
Figure 3D:
FIG. 3D illustrates a perspective view of a horizontal detector box or housing, in accordance with some embodiments of the present specification.

In embodiments, the detector array 120 is a horizontal array of pixelated detectors. The detector array 120 may be two dimensional—that is, have a plurality of rows of detectors. As a non-limiting illustration, FIG. 3D shows a horizontal detector box or housing 310 comprising a plurality of detectors 315.

In some embodiments, the detector array 120 may be formed by a stack of crystals that generate analog signals when X-rays impinge upon them, with the signal strength proportional to the amount of beam attenuation in the OUI 125. In one embodiment, the X-ray beam detector arrangement consists of a linear array of solid-state detectors of the crystal-diode type. A typical arrangement uses cadmium tungstate scintillating crystals to absorb the X-rays transmitted through the OUI 125 and to convert the absorbed X-rays into photons of visible light. Crystals such as bismuth germinate, sodium iodide or other suitable crystals may be alternatively used as known to a person of ordinary skill in the art. The crystals can be directly coupled to a suitable detector, such as a photodiode or photo-multiplier. The detector photodiodes could be linearly arranged, which through unity-gain devices, provide advantages over photo-multipliers in terms of operating range, linearity and detector-to-detector matching.

A computing device is in data communication with the source 118, platform 115, detector array 120 and the conveyor 112. The conveyor 112, upon receiving a control signal from the computing device, transports and positions the OUI 125 on the platform 115 for scanning.

In various embodiments the OUI 125 comprises bulk materials, large packages and objects such as, but not limited to, ULD (Unit Load Devices) containers having densely packaged goods and palletized goods/freight. The entrance doors 102 and exit doors 110 of the enclosure 101 have dimensions sufficient to accommodate typical pallet and ULD dimensions. In various embodiments, the separation between the source 118 and detector array 120 is such that for a given emission angle and detector extent objects of all sizes that reside on the platform or table 115 have their full extent scanned.

In both the aviation and palletized freight scenarios, multiple scanning system setups can be considered. For example, each scanning system setup (for the aviation and palletized freight scenarios) has differing throughput demands. As such, the inspection system of the present specification allows for the flexibility to achieve the necessary throughput for any given setup/deployment.

In accordance with some objects, the inspection system of the present specification utilizes a dual motor/gearbox configuration of the platform or table to allow for operation at multiple speeds using otherwise the same/common rotational hardware. Each setup, directed towards the aviation and palletized freight scenarios, may require different dose outputs, and consequently the inspection system of the present specification uses an adjustable, dose modulating X-ray source. The inspection system of the present specification when deployed in, say, aviation and palletized freight scenarios may be required to scan at differing throughputs while still requiring to achieve the same average dose footprint—which would require the dose output of the source to be halved. Also, in the event that the inspection system of the present specification requires a minimum performance, but has restrictions on dose and throughput, a flexible detector architecture that allows for simply increasing or reducing the number of columns of detectors without significant other hardware changes is desirable.

It should be further appreciated that the inspection system of the present specification also has application outside of the security space. Namely, non-destructive testing of large, heavy and high-density objects for inspection of internal componentry, monitoring of behavior over time or analysis of structural defects or inconsistencies. Many NDE (Non-destructive Evaluation) facilities require hardware to be delivered for inspection. This is both time consuming and expensive, and in some instances impossible given restrictions placed on moving delicate, expensive and/or hazardous (including radioactive) materials. Consequently, the inspection system of the present specification provides a deployable inspection platform for operation at a customer site and configurable to meet the specific performance, dose, and throughput requirements of the facility.

Radiation Source

When triggered or activated by the computing device, source 118 is configured to irradiate the OUI 125 with a horizontally divergent fan beam 130 of pulsed X-rays. That is, a central axis of the fan beam 130 is substantially horizontal. Persons of ordinary skill in the art would appreciate that a use of two-dimensional detector arrays 120 necessitates the use of a "wide" or "cone" type beam that inherently has a slight angular deviation from a true horizontal. In embodiments, the angular deviation of the beam from the horizontal ranges between 0 and 2.5 degrees. This deviation is, however, corrected for by use of a reconstruction algorithm. The high-energy radiation source 118 may be, but is not limited to, a high dose, high energy linear accelerator (LINAC) or Betatron. The choice of source type, its intensity, and energy output depends upon the sensitivity of the detectors, the radiographic density of the object in the space between the source and detectors, radiation safety considerations, and operational requirements, such as the inspection speed. One of ordinary skill in the art would appreciate the factors that need to be considered in order to select a radiation source type, depending upon inspection requirements. In one embodiment, where the OUI 125 is a large sized ULD that highly attenuates the X-ray beam, the radiation may be from an X-ray source operating at an energy ranging from approximately 750 keV and even up to 10 MeV or more. As a non-limiting example, a large sized ULD may have a size of up to 156 cm×15 cm×162 cm.

In some embodiments, the radiation source 118 uses interlaced dual energy pulses in order to generate X-ray scan images of low energy (ranging from 3 MeV to 5 MeV) and high energy (ranging from 6 MeV to 9 MeV) of the OUI 125.

Figure 2:
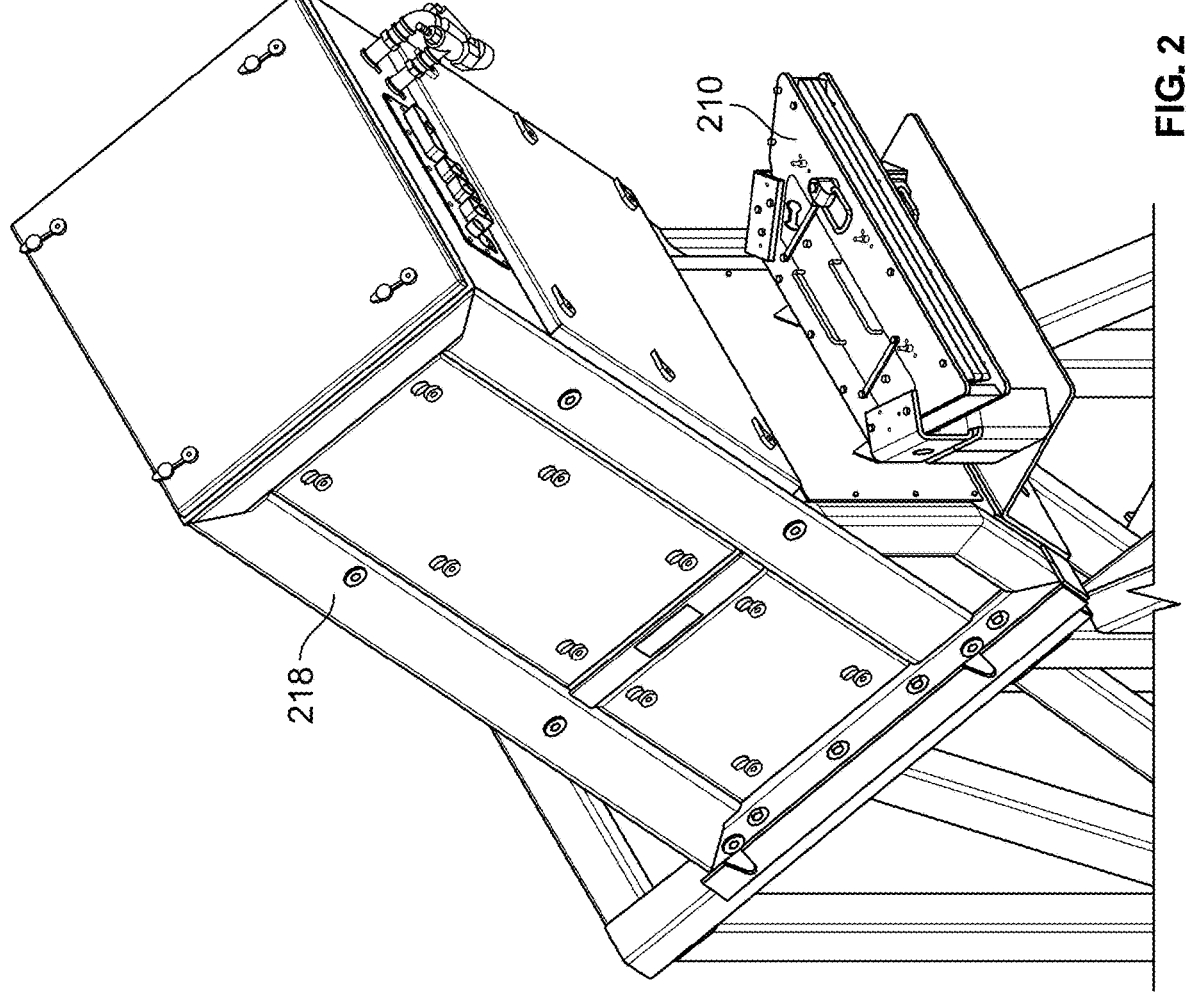
FIG. 2 shows a LINAC based source positioned at a height, in accordance with some embodiments of the present specification.

FIG. 2 shows a LINAC-based source 218 positioned at a height and with a horizontally mounted secondary collimator 210. The secondary collimator 210 is configured to shape an X-ray beam emitted by the source 218 into a substantially horizontally divergent fan beam. In embodiments, the LINAC 218 or any other source provides a radiation dose sufficient for imaging ULDs and pallets. In an embodiment, the energy and dose output of the LINAC or any other source ranges from 750 keV to 10 MeV and 0.01 Gy/min to 30 Gy/min respectively.

It should be appreciated that the height of positioning of the source 218 needs to be such that the horizontally divergent fan beam, when pulsing at the start of the scan (and the OUI is stationary) is not occluded. Therefore, with a maximum pallet height of approximately 2.2 m, the source 218 must be positioned at a height of at least 2.2 m. Accounting for the lifting and rotating mechanism upon which the OUI resides, in embodiments, the source 218 may be positioned at a height of about 2.5 m with a deviation of 1 m in either direction (+/−1 m). Stated differently, the height at which source 218 is positioned may range from 1.5 m to 3.5 m.

Platform or Table

The platform or table 115, upon receiving control signals from the computing device, is configured to rotate as well as move or translate vertically upwards and downwards (that is, in a vertical trajectory). This causes the OUI 125, positioned on the platform 115, to be rotated as well as moved vertically up and down. In some embodiments, the OUI 125 (positioned on the platform 115) moves upwards and downwards in a helical trajectory. In some embodiments, the OUI 125 (positioned on the platform 115) moves upwards in a helical trajectory and moves downwards in a vertical trajectory. In some embodiments, the OUI 125 (positioned on the platform 115) moves upwards and downwards in a vertical trajectory. In some embodiments, the OUI 125 (positioned on the platform 115) moves upwards vertically and rotates in a stepwise sequence as follows: the OUI 125 moves vertically upwards by a predefined step or height, stops moving vertically upwards and then rotates while remaining static in the vertical direction. After a full rotation, the OUI 125 stops rotating and moves vertically upwards again by the predefined step or height. This sequence of stepwise vertical and rotation movement is repeated until the entire height of the OUI 125 has been scanned. The stepwise sequence of vertical and rotational movement is desired when OUI 125 needs to be moved very slowly so as not to disrupt the contents. Thereafter, the OUI 125 moves downwards in a vertical trajectory or in a stepwise vertical trajectory (without any rotational motion).

It should be appreciated that the OUI 125 must be elevated through its entire height, such that the entire OUI passes through the X-ray beam 130. Therefore, the height of vertical trajectory/motion is approximately equal to the height of the horizontal fan beam from the floor—that is, the height of positioning of the source 118. Accordingly, in some embodiments, the height of vertical trajectory/motion is up to about 2.5 m for a large pallet. For movement of the OUI 125 in a helical trajectory, the number of rotations of the platform or table 115 (and hence the OUI 125) is dependent upon the height of the scan and the size of the detector array 120. As a non-limiting example, for a 6 wide detector array (small X-ray cone) and a 2.2 m OUI height, 100 rotations are required. On the other hand, for a 20 wide array (large X-ray cone) only 30 rotations are required.

Figure 4A:
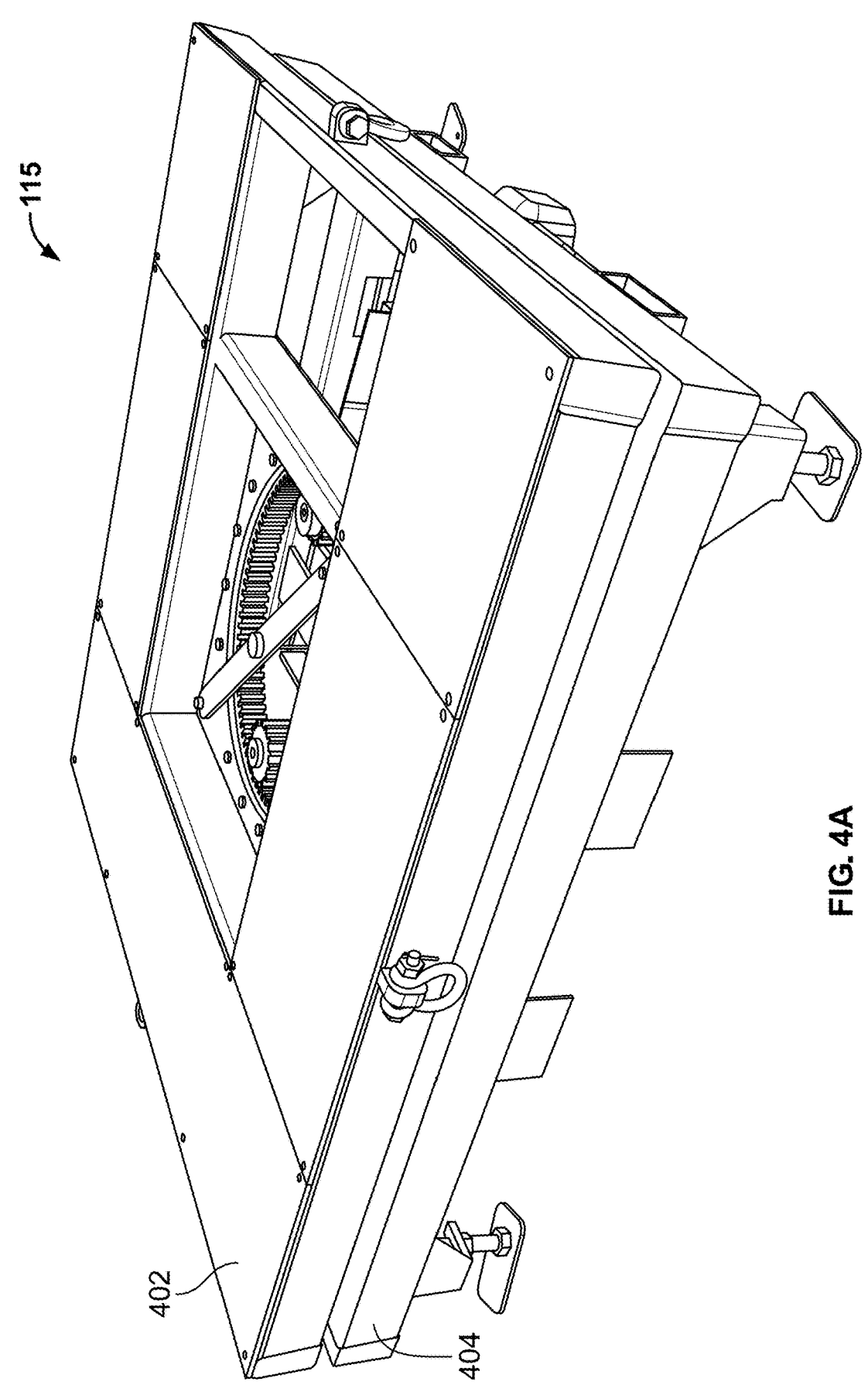
FIG. 4A shows a perspective view of a platform or table, in accordance with some embodiments of the present specification.
Figure 4B:
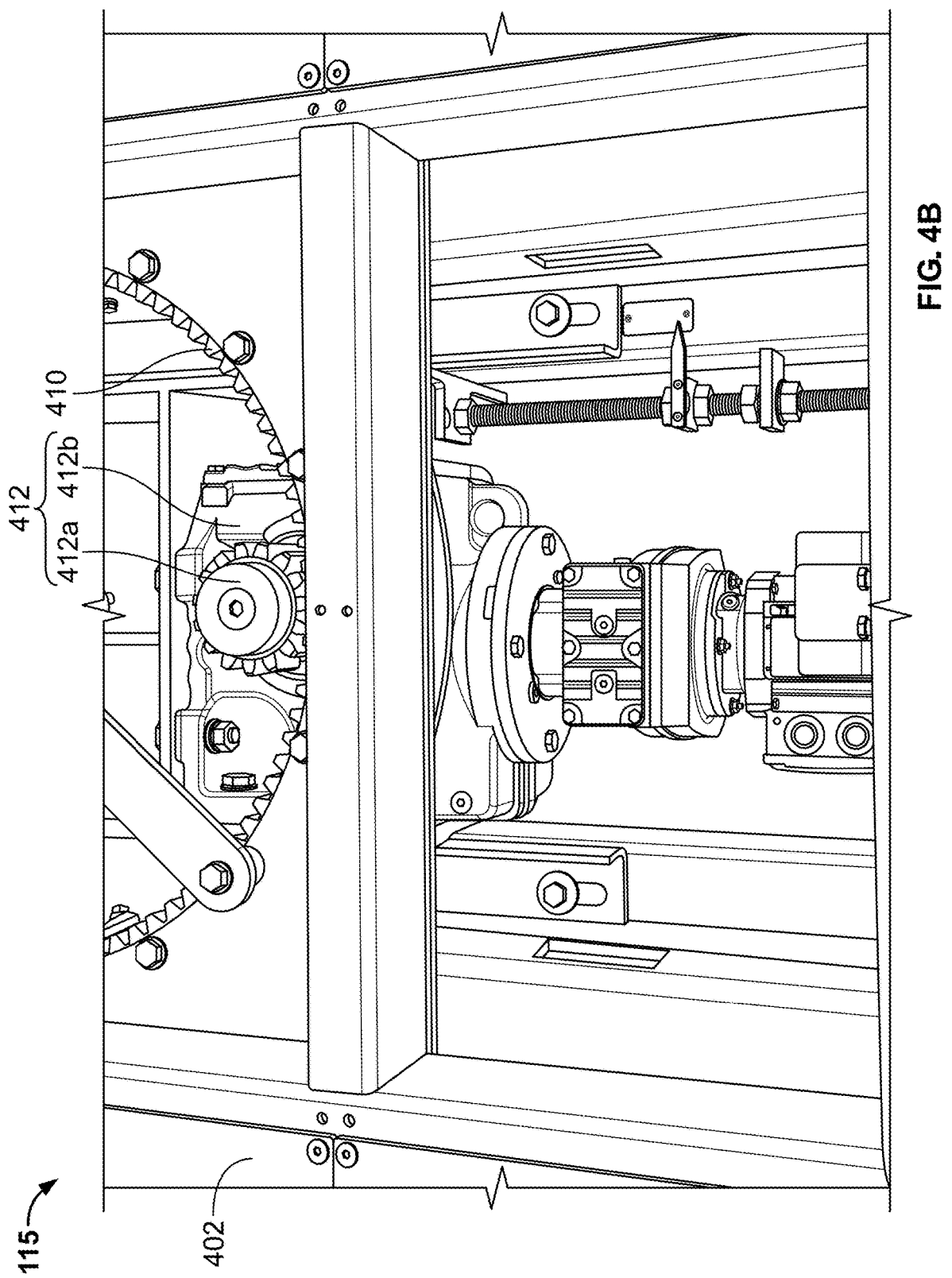
FIG. 4B shows a first plan view of the platform or table, in accordance with some embodiments of the present specification.
Figure 4C:
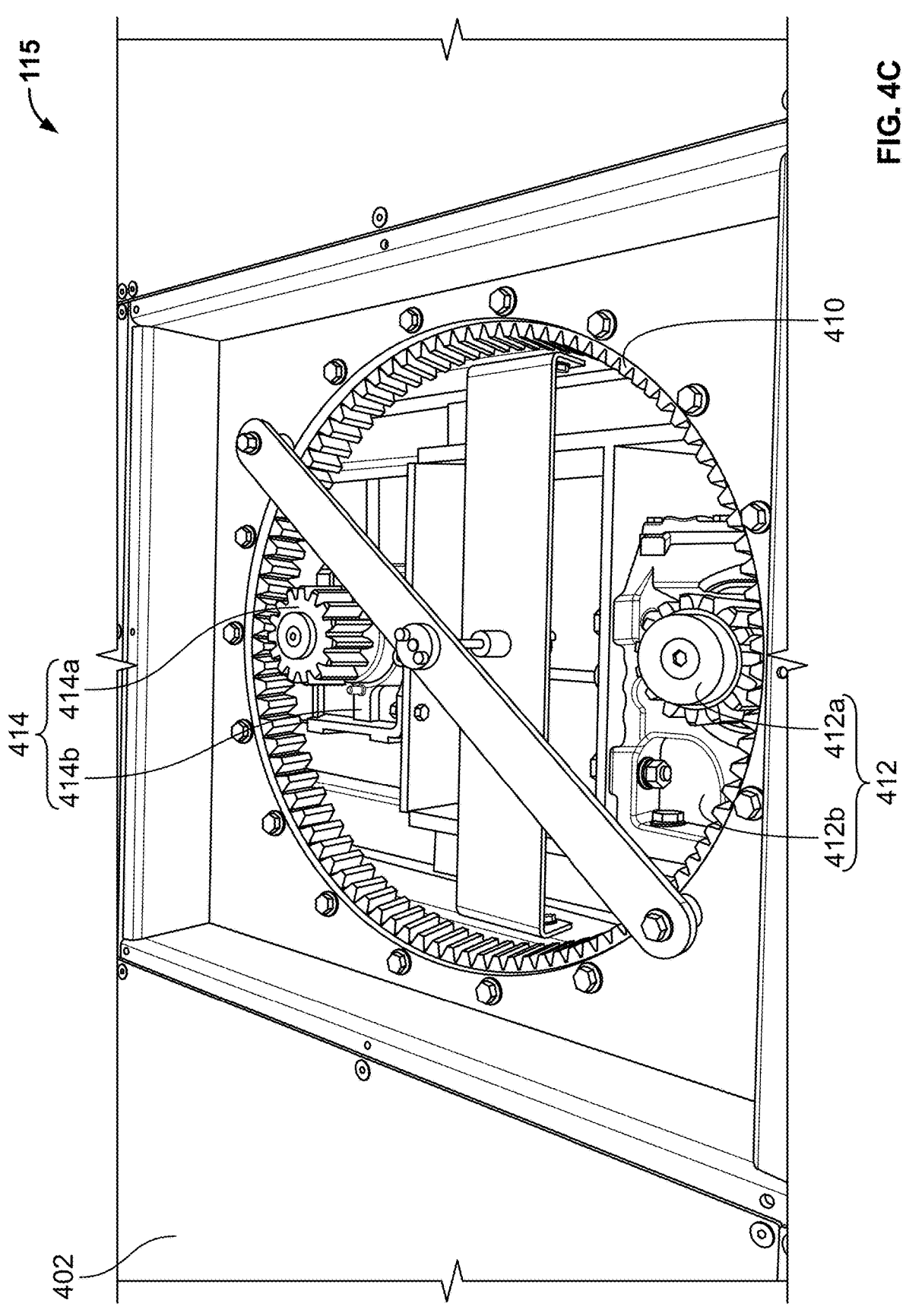
FIG. 4C shows a second plan view of the platform or table, in accordance with some embodiments of the present specification.

FIG. 4A shows a perspective view of the platform or table 115 while FIGS. 4B and 4C show first and second plan views of the platform or table 115, in accordance with some embodiments of the present specification. Referring now to FIGS. 4A, 4B and 4C, in some embodiments, the platform or table 115 includes a first support member 402 positioned on top of a second support member 404. The first support member 402 is configured to rotate (helical rotation) as well as translate (vertically up and down) while the second support member 404 lies on the floor or proximate to the floor of the inspection box, area or region (central scan enclosure) 106 (FIG. 1A).

Figure 4D:
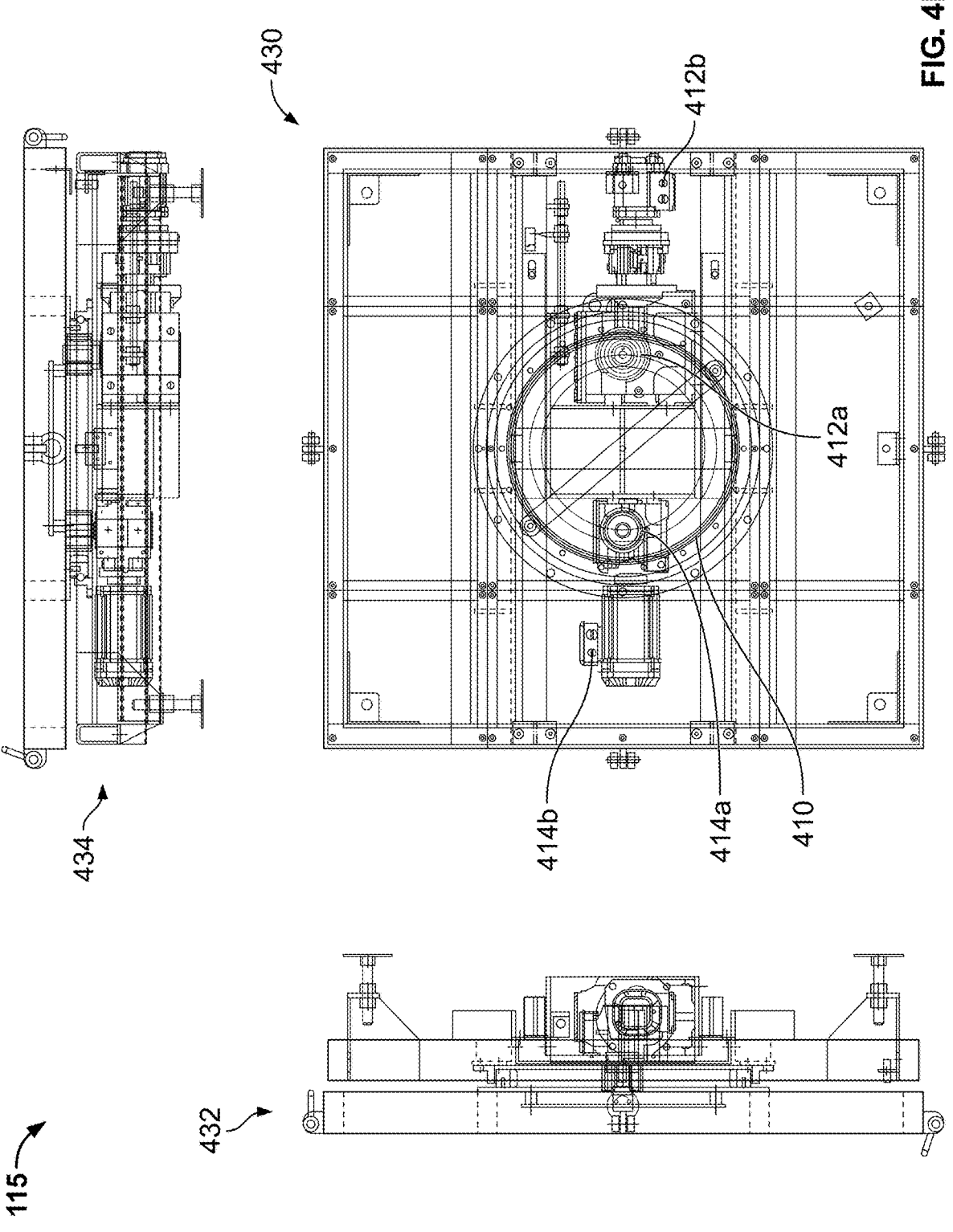
FIG. 4D shows blue-print designs of a plan view, long with a first side view and second side view of the platform or table shown in FIGS. 4A, 4B, and 4C, in accordance with some embodiments of the present specification.

In accordance with some embodiments, the first support member 402 is configured to rotate at a first scanning speed and a second scanning speed. In embodiments, the first scanning speed is slower than the second scanning speed. In embodiments, the first scanning speed is equal to the second scanning speed. In embodiments, the second scanning speed is slower than the first scanning speed. In order to achieve the first scanning speed and second scanning speed, the platform or table 115 includes a first driving mechanism 412 having a first gearbox 412a and motor assembly 412b and a second driving mechanism 414 having a second gearbox 414a and motor assembly 414b. FIG. 4D shows a plan view 430 as well as first and second side views 432, 434 of the platform or table 115, in accordance with some embodiments of the present specification. The figure shows a first drive gear 412a and first low speed motor 412b of the first driving mechanism 412, a second drive gear 414a and second high speed motor 414b of the second driving mechanism 414 as well as a slewing ring 410.

The platform or table 115 includes a shaft attached to the bottom of the first support member 402 and projecting down into a void where the first driving mechanism 412 and second driving mechanism 414 are mounted. The first driving mechanism 412 and second driving mechanism 414 incorporate two sliding drives that move to engage with the slew ring 410 that in turn is mounted on the underside of the first support member 402. Within the space, under the first support member 402, resides an encoder shaft down through a center of the slew ring 410 and between the first driving mechanism 412 and second driving mechanism 414 on either side which is configured to provide, to a PLC (Programmable Logic Controller) in data communication with a computing device, electrical feedback/signal of an angular position of the slew ring/rotating platform during scanning. Both the first driving mechanism 412 and second driving mechanism 414 are mounted onto a common frame so they can slide such that only one drive gear 412a or 414a is engaged with the slew ring 410 at any one time.

Based on control signals from the computing device to the PLC, each of the first driving mechanism 412 and second driving mechanism 414 can be driven in and out of position automatically (in order to drive the slew ring 410 and hence rotate the first support member 402) depending upon the range of imaging speeds required. In embodiments, when engaged, the first driving mechanism 412 having the larger, slower rotational gearbox assembly 412a allows for operation at rotational speeds ranging from about 5 minutes a rotation (very high-performance imaging) to 30 seconds a rotation while the second driving mechanism 414 having the smaller, faster rotational gearbox assembly 414a allows for much faster rotational speeds ranging from about 30 seconds to 0.5 seconds per rotation.

Additionally, the platform or table 115 includes a lifting and lowering mechanism to enable the first support member 402 to be translated vertically upwards and downwards. In some embodiments, the lifting and lowering mechanism is a corkscrew/scissor lift that raises or lowers the first support member 402 while the second support member 404 remains firmly positioned on the floor. In some embodiments, the lifting and lowering mechanism is a hoist that is raised and lowered though a piston assembly seat at height. In various embodiments, the lifting mechanism is characterized by having: a) smooth motion, b) feedback from a proximity/distance sensor of height during scanning (with a resolution ranging between 0.5 mm and 3 mm depending upon detector dimensions and pitch).

In various embodiments, the system 100 has a throughput ranging from 5 units to 30 units per hour. In various embodiments, the system 100 has a throughput of at least 5 units per hour. In embodiments, higher throughputs can be achieved by capturing scan images without rotation of the platform or table 115. In this case, the vertical motion can proceed at a much faster pace, with scan times of the order of seconds and not minutes.

In various embodiments, the rate of vertical translational motion (or lift) and rotational motion are determined by one or more of the following factors:

A maximum speed that the OUI 125 can be rotated at based on safety, contents, and/or structure. In embodiments, but not limited to such embodiments, the speed is less than 5 seconds per revolution.

A desired maximum and/or minimum LINAC (source 118) pulse frequency. In some embodiments, the LINAC pulse frequency ranges from 50 Hz to 1000 Hz, or increments therein, but is not limited to such range.

A height of the detector array 120, which corresponds to the extent of the two-dimensional array 120 and specifically the number of independent detector pixel elements in a vertical direction. In some embodiments, the height of the detector array ranges from a single row up to 20—that is, ranges from about 6 mm to 20×6 mm.

A maximum and/or minimum speed that the first drive mechanism 412 and second drive mechanism 414 are capable of achieving. In some embodiments, the speed of the first drive mechanism 412 is less than 1 second per revolution and that of the second drive mechanism 414 is greater than 1 second per revolution.

A required throughput. In some embodiments, the throughput ranges from 5 to 30 units or pallets per hour. In various embodiments, the system 100 has a throughput of at least 5 units per hour.

A required image performance. In some embodiments, the required image performance corresponds to standard HE (High Energy) image performance specifications of penetration/grid resolution/wire detection/contrast.

A required time-averaged dose of the surroundings given the shielding design package of the system 100. In some embodiments, dose of the surroundings is kept below 0.5 uSv per hour to comply with standards.

Referring back to FIG. 1B, in accordance with some embodiments, for scanning, the OUI 125 resides on the platform or table 115 that causes the OUI 125 to be moved vertically upwards while being rotated simultaneously (that is, in a helical trajectory)). As the OUI 125 moves in the helical path it passes through the horizontal X-ray fan beam 130. The beam 130 is incident upon the horizontal detector array 120, generating image slices of the OUI 125 as it passes through the beam 130. Standard filtered back projection techniques are then used to reconstruct a 3D image of the OUI 125 for inspection.

Exemplary Imaging/Scanning Parameters

Referring back to FIG. 1B, the system 100 is characterized by the following exemplary parameters. In some embodiments, as shown in FIG. 3A, a first configuration of the detector array 120a is 6 channels or pixels 302 tall/high with approximately 5.6 mm pitch centerline to centerline. This gives a total per-pulse image slice of 33.6 mm. In some embodiments, the first configuration of the detector array 120a is 1 to 6 channels or pixels 302 tall/high. FIG. 3C shows a perspective view of the detector array 120a with a 3D tungsten printed collimator 310 positioned on top.

In some embodiments, as shown in FIG. 3B, a second configuration of the detector array 120b is 8 channels or pixels 304 tall/high. In some embodiments, the second configuration of the detector array 120b is 8 to 12 channels or pixels 304 tall/high. In some embodiments, the detector arrays 120a, 120b use the same bracketry, PCB and mounting hardware for flexibility in offering best performance versus throughput and scan speed. In various embodiments, the number of channels or pixels (in the detector array 120) is configurable between 1 and 20.

In some embodiments, the source 118 is positioned with a target-to-detector array distance along a central axis of approximately 6.1 m and with a center of the OUI 125 approximately 4 m form the target. In various embodiments, the target-to-detector array distance along the central axis ranges from 4 to 8 m and the distance of the center of the OUI 125 from the target ranges from 3 to 6 m.

In some embodiments, the system 100 has a magnification of approximately 6.1/4=1.525. This gives a reconstructed resolution of about 22 mm per slice. In some embodiments, provided by way of example only and not meant to be limiting, we assume that a total height 'h' of the OUI 125 is approximately 1000 mm. This would require 45 revolutions (1000/22). Thus, for every rotation or revolution, the OUI 125 would be moved vertically by 22 mm (that is, a slice width of 22 mm). In other words, there are approximately 45×22 mm slices in the 1000 mm height of the OUI 125.

In embodiments, since the enclosure 101 needs to accommodate a pallet or ULD having a maximum height (by ISO standards) of up to 1.83 m or 72 inches, the system would require an enclosure of at least twice this value. Thus, in embodiments, an overall height 'H' of the central scan enclosure (inspection area or region) 106 is at least two times (2×) a maximum height of the OUI 125 as the entire height of the OUI 125 needs to pass through the scanning fan beam 130. In some embodiments, the overall height 'H' of the central scan enclosure (inspection area or region 106) ranges from 3.5 m to 10 m, and is preferably 5 m, also taking into account the conveyor system height and headroom clearance.

In various embodiments, the platform or table 115 is configured to rotate through a wide range of values, based upon which of the first or second driving mechanism 412, 414 is being engaged/used. When engaged, the first driving mechanism 412 having the larger, slower rotational gearbox assembly 412a allows for operation at speeds between about 5 minutes a rotation (very high performance imaging) and 30 seconds a rotation whilst the second driving mechanism 414 having the smaller, faster rotational gearbox assembly 414a allows for much faster rotations of between 30 seconds and 0.5 seconds per rotation. In one embodiment, upon engaging the first driving mechanism 412 the platform or table 115 can rotate at a speed of 10 seconds per revolution, for example. In one embodiment, upon engaging the second driving mechanism 414 the platform or table 115 can rotate at a speed of 5 minutes per revolution, for example.

In some embodiments, a width of the detector array 120 is approximately 3.6 m. With a horizontal pitch of 6.1 mm, this gives a number of sample points per projection line 'S'=590. Accordingly, a number of required projections 'P' is then approximately equal to S*pi/2=927 (let's say 1000). This, in turn, equates to 1 projection every 0.36 degrees.

Now, a rotational speed (of the platform or table 115) of 10 seconds per revolution=0.01 seconds per projection=100 Hz LINAC (source 118) pulse repetition frequency. Also, 10 seconds a revolution and 45 revolutions=450 seconds=7.5 minute per scan (Ignoring vertical motion of the platform or table 115). From this, the following scan parameters can be extrapolated: (i) 200 Hz LINAC −5 seconds per revolution −3.25 min per scan, and (ii) 400 Hz LINAC −2.5 seconds per revolution −1.625 min per scan.

In various embodiments, the system 100 has a throughput of 5 units to 30 units an hour. In various embodiments, the system 100 has a throughput of at least 5 units per hour.

Scanning Methods

FIG. 5 is a flowchart of a plurality of exemplary steps of a method 500 for operating the system 100 installed within the enclosure 101, in accordance with a first embodiment of the present specification. Referring now to FIGS. 1A, 1B and 5, at step 502, the platform or table 115 is configured to rotate and move vertically upwards in order to achieve a desire scanning speed. At least one of the first drive mechanism or 412 or second drive mechanism 414 is engaged to enable the platform or table 115 to rotate at a desired rotational speed. Similarly, the lifting mechanism is engaged to enable the platform or table 115 to move vertically upwards at a desired translational speed.

At step 504, the OUI 125 is placed on the conveyor 112 that is configured to transport the OUI 125 into the inspection box, area or region 106 and position the OUI 125 on the platform or table 115. As the OUI 125 reaches the center of the inspection box, area or region 106 a shielding door of the entrance door 102 is closed.

At step 506, the source 118 is configured to fire the horizontal fan beam 130 and to capture calibration data. At this point, a total height (or a first plane of the top) of the OUI 125 resides below a second plane of the horizontal fan beam 130 of the X-rays. Consequently, the detector array 120 is configured to acquire an X-ray scan signal corresponding to the horizontal fan beam 130 that is not being occluded by the OUI 125. The computing device is configured to generate calibration data corresponding to the non-occluded X-ray scan signals.

At step 508, the platform or table 115 is configured to cause the OUI 125 to simultaneously rise and rotate. In some embodiments, the OUI 125 (positioned on the platform 115) moves upwards and downwards in a helical trajectory. In some embodiments, the OUI 125 (positioned on the platform 115) moves upwards in a helical trajectory and moves downwards in a vertical trajectory. In some embodiments, the OUI 125 (positioned on the platform 115) moves upwards and downwards in a vertical trajectory. In some embodiments, the OUI 125 (positioned on the platform 115) moves upwards vertically and rotates in a stepwise sequence as follows: the OUI 125 moves vertically upwards by a predefined step or height, stops moving vertically upwards and then rotates while remaining static in the vertical direction. After a full rotation the OUI 125 stops rotating and moves vertically upwards again by the predefined step or height. This sequence of stepwise vertical and rotation movement is repeated until the entire height of the OUI 125 has been scanned. The stepwise sequence of vertical and rotational movement is desired when OUI 125 needs to be moved very slowly so as not to disrupt the contents. Thereafter, the OUI 125 moves downwards in a vertical trajectory or in a stepwise vertical trajectory (without any rotational motion).

At step 510, as the OUI 125 is raised it passes through the horizontal fan beam 130 of pulsed high-energy X-rays. As discussed earlier in this specification, the beam 130 of X-rays is emitted from the X-ray source 118 positioned at height on one side of the OUI 125.

At step 512, the X-rays transmitted through the OUI 125 impinge upon the detector array 120 that is configured to generate corresponding scan data. The scan data is processed by the computing device by applying a filtered back projection algorithm in order to reconstruct a 3D image of the OUI 125 for display on a screen associated with the computing device.

At step 514, once an entire height of the OUI 125 is scanned, the source 118 is switched off and the OUI 125 is lowered down by the platform or table 115 to subsequently allow the conveyor 112 to move the scanned OUI 125 through a now open exit shielding door 110. In parallel to the offloading process of step 514, another object is loaded into the enclosure 101 in order to maximize throughput. In some embodiments, the platform or table 115 continues to rotate as well as translate vertically downwards. In some embodiments, the platform or table 115 stops rotating while translating vertically downwards.

In a second embodiment, higher throughputs can be achieved by modifying the method 500 to capture scan images without rotating the OUI 125. That is, the platform or table 115 is configured to only translate the OUI 125 vertically upwards for scanning (without rotation). In this embodiment, the vertical upwards motion of the OUI 125 can proceed at a much faster pace, with scan times of the order of seconds and not minutes.

In a third embodiment, scan data is captured at a number of discrete angles. In this way the object can be scanned, say at 30 degrees (the angular rotation may vary in various embodiments) during vertical upward lift, then rotated another 30 degrees whilst at a height, before being scanned whilst being lowered. This provides scan times and throughputs somewhere between the first and second embodiments described above—and corresponding detection capabilities somewhere in between.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A system for inspecting an object, comprising:
   a source of X-ray radiation;
   a horizontal array of detectors, wherein the source and the array of detectors are positioned substantially on a first plane, and wherein the array of detectors has channels or pixels ranging from 1 to 20;
   a platform configured to rotate and configured to translate in a vertical trajectory, wherein the platform is positioned on a second plane between the source and the array of detectors, wherein the platform is adapted to receive and support the object, and wherein a rate or speed of vertical translational of the platform is based on a radiation dose output of the source being below 0.5 uSv per hour; and
   a computing device configured to:
      cause the source to fire a substantially horizontal fan beam of X-rays in a third plane, wherein the third plane is above a top of the object;
      acquire calibration data from the array of detectors while the third plane is above the top of the object;
      cause the platform to simultaneously rotate and raise the object vertically upwards;
      acquire scan data of the object; and
      use the calibration and scan data to generate a three dimensional scan image of the object.

2. The system of claim 1, wherein the object is a densely packed Unit Load Device or a pallet.

3. The system of claim 1, wherein the source is a LINAC or Betatron configured to operate at an energy ranging from approximately 750 keV and up to 10 MeV.

4. The system of claim 1, wherein the source has a dose output ranging from 0.01 Gy/min to 30 Gy/min.

5. The system of claim 1, wherein the source includes a secondary collimator configured to generate the horizontal fan beam of X-rays.

6. The system of claim 1, wherein the array of detectors is 1 to 6 channels or pixels tall.

7. The system of claim 1, wherein the array of detectors is 8 to 12 channels or pixels tall.

8. The system of claim 1, wherein the system has a magnification of approximately 1.525 and a reconstructed resolution of about 22 mm per slice.

9. The system of claim 1, wherein the system has a throughput of at least 5 units per hour.

10. The system of claim 1, wherein the platform includes a first drive mechanism configured to rotate the object at a first rotational speed and a second drive mechanism configured to rotate the object at a second rotational speed.

11. The system of claim 10, wherein the first rotational speed ranges from about 5 minutes a rotation to 30 seconds a rotation, and wherein the second speed ranges from about 30 seconds a rotation to 0.5 seconds a rotation.

12. The system of claim 10, wherein the platform further includes a corkscrew/scissor lift that raises or lowers the object.

13. The system of claim 10, wherein the platform further includes a hoist that is raised and lowered though a piston assembly for raising or lowering the object.

14. A method of inspecting an object using a platform positioned between a source of X-ray radiation and a horizontal detector array, the method comprising:

transporting the object over a conveyor to position the object on the platform;

triggering the source to fire a horizontally diverging fan beam, wherein a plane of the fan beam is above a top surface of the object;

acquiring calibration data using the detector array, wherein the array of detectors has channels or pixels ranging from 1 to 20;

causing the platform to rotate as well as rise vertically upwards in order to move the object in a substantially helical trajectory, wherein a rate or speed of vertical movement of the platform is based on a radiation dose output of the source being below 0.5 uSv per hour;

acquiring scan data by exposing the moving object to the fan beam; and generating, using the calibration and scan data, a three dimensional scan image of the object.

15. The method of claim 14, wherein the object is a densely packed Unit Load Device or a pallet.

16. The method of claim 14, wherein the source is a LINAC or Betatron configured to operate at an energy ranging from approximately 750 keV and up to 10 MeV.

17. The method of claim 14, wherein the source has a dose output ranging from 0.01 Gy/min to 30 Gy/min.

18. The method of claim 14, wherein the source includes a secondary collimator configured to generate the horizontal fan beam of X-rays.

19. The method of claim 14, wherein the detector array is 1 to 6 channels or pixels tall.

20. The method of claim 15, wherein the detector array is 8 to 12 channels or pixels tall.

21. The method of claim 14, wherein the method enables a magnification of approximately 1.525 and a reconstructed resolution of about 22 mm per slice.

22. The method of claim 14, wherein the method enables has a throughput of at least 5 units per hour.

23. The method of claim 14, wherein the platform includes a first drive mechanism configured to rotate the object at a first rotational speed and a second drive mechanism configured to rotate the object at a second rotational speed.

24. The method of claim 23, wherein the first rotational speed ranges from about 5 minutes a rotation to 30 seconds a rotation, and wherein the second speed ranges from about 30 seconds a rotation to 0.5 seconds a rotation.

25. The method of claim 23, wherein the platform further includes a corkscrew/scissor lift that raises or lowers the object.

26. The method of claim 23, wherein the platform further includes a hoist that is raised and lowered though a piston assembly for raising or lowering the object.

27. The method of claim 14, further comprising:

causing the platform to move vertically downwards when an entire height of the object has been scanned; and transporting the object away from the platform while simultaneously conveying another object towards the platform.

28. A system for inspecting an object, comprising:

a source of X-ray radiation;

a horizontal array of detectors, wherein the source and the array of detectors are positioned substantially on a first plane, and wherein the array of detectors includes channels or pixels ranging from 1 to 20;

a platform configured to rotate as well as translate in a vertical trajectory, wherein the platform is positioned on a second plane between the source and the array of detectors, and wherein the object is disposed on the platform; and a computing device configured to:

cause the source to fire a substantially horizontal fan beam of X-rays in a third plane, wherein the third plane is above a top of the object;

acquire calibration data from the array of detectors while the third plane is above the top of the object;

cause the platform to simultaneously rotate and raise the object vertically upwards, wherein a rate or speed of vertical movement of the platform is based on a radiation dose output of the source being below 0.5 uSv per hour;

acquire scan data of the object;

use the calibration and scan data in order to generate a three dimensional scan image of the object; and move the platform vertically downwards to the second plane once an entire height of the object has been irradiated with the fan beam.

29. The system of claim 28, wherein the object is a densely packed Unit Load Device or a pallet.

30. The system of claim 28, wherein the platform does not rotate while moving vertically downwards.

31. The system of claim 28, wherein the platform continues to rotate while moving vertically downwards.

* * * * *